Figure 1:
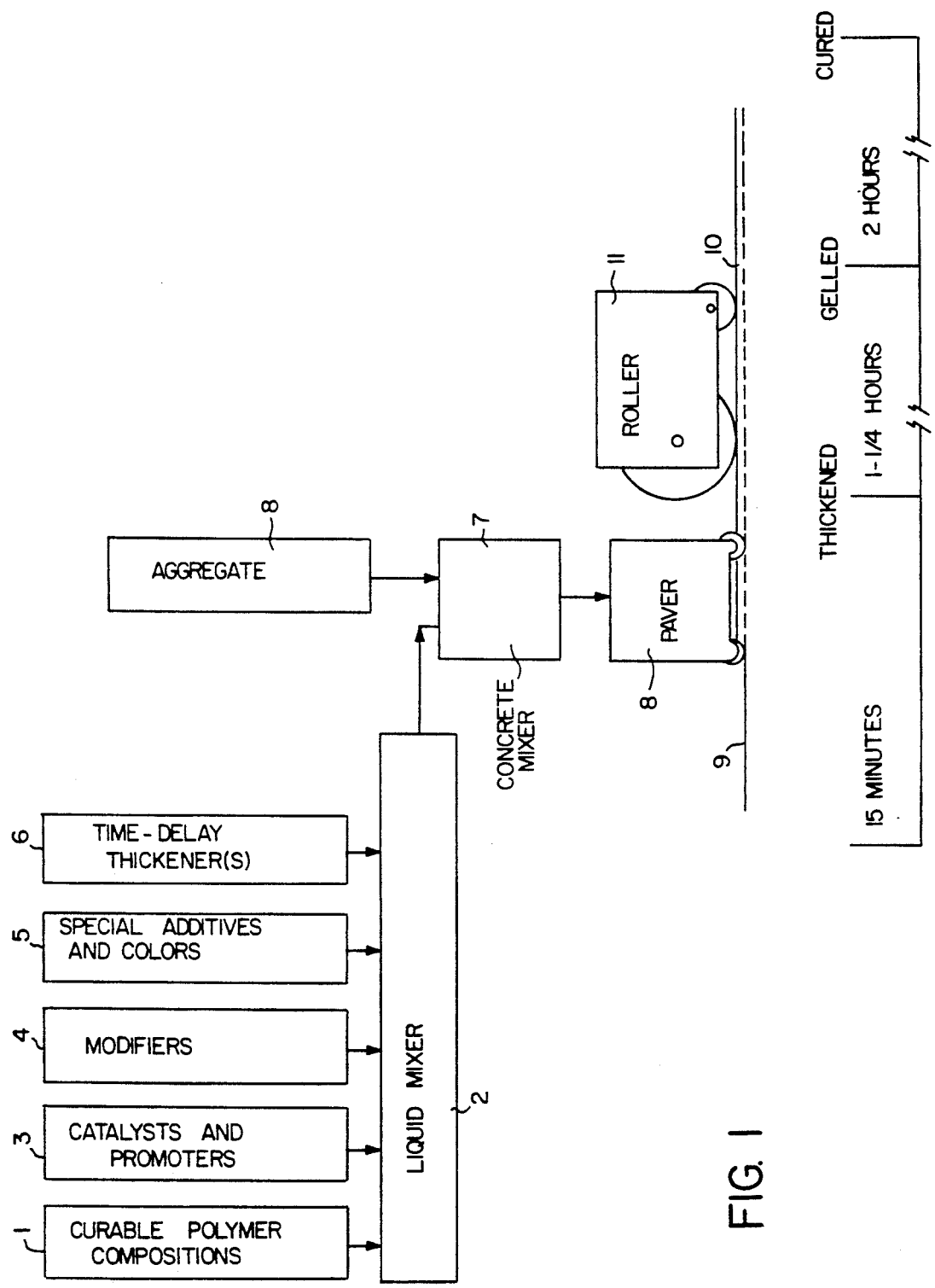

United States Patent [19]
Fekete et al.

[11] Patent Number: 5,242,708
[45] Date of Patent: Sep. 7, 1993

[54] TIME DELAYED THICKENING SLUMP-RESISTANT POLYMER CONCRETE COMPOSITION, METHODS OF REPAIRING CONCRETE SURFACES, CONCRETE STRUCTURES REPAIRED THEREWITH AND ARTICLES OF CONSTRUCTION COMPRISING A FORMED MASS OF SAID COMPOSITIONS IN CURED CONDITION

[75] Inventors: Frank Fekete, 4403 McKenzie Dr., Monroeville, Pa. 15146; David T. Thrash, Ruffsdale, Pa.

[73] Assignee: Frank Fekete, Monroeville, Pa.

[21] Appl. No.: 882,769

[22] Filed: May 11, 1992

Related U.S. Application Data

[63] Continuation of Ser. No. 689,731, Apr. 24, 1991, abandoned, which is a continuation of Ser. No. 538,697, Jun. 18, 1990, abandoned, which is a continuation of Ser. No. 408,953, Sep. 18, 1989, abandoned, which is a continuation of Ser. No. 220,963, Jun. 16, 1988, abandoned, which is a continuation of Ser. No. 941,073, Dec. 12, 1986, abandoned.

[51] Int. Cl.$^5$ .............................. B05C 1/16; C08J 3/00
[52] U.S. Cl. .................................. 427/136; 427/138; 427/139; 427/140; 427/393.6; 427/407.1; 524/8; 524/5; 524/2; 428/331; 428/425.5; 428/702; 428/703; 525/268; 525/269; 525/377; 525/329.9; 525/330.2; 525/529; 525/531
[58] Field of Search ............. 525/268, 269, 377, 329.9, 525/330.2, 529, 531; 524/8, 5, 2; 428/331, 425.5, 702, 703; 427/138, 136, 139, 140, 393.6, 407.1

[56] References Cited

U.S. PATENT DOCUMENTS

| | | | |
|---|---|---|---|
| 3,008,387 | 11/1961 | Whittenwyler | 427/136 |
| 3,373,221 | 3/1968 | May | 525/531 |
| 3,423,224 | 1/1969 | Schmidt et al. | 427/136 |
| 3,431,320 | 3/1969 | Baum et al. | 525/27 |
| 3,466,259 | 9/1969 | Jernigan | 260/37 |
| 3,575,785 | 4/1971 | McManimie et al. | 161/162 |
| 3,674,727 | 7/1972 | Fekete et al. | 260/22 D |
| 3,892,704 | 7/1975 | Higashimura et al. | 524/650 |
| 4,073,828 | 2/1978 | Ferrarini et al. | 260/859 R |
| 4,129,641 | 12/1978 | Ferrarini et al. | 264/294 |
| 4,232,133 | 11/1980 | Ferrarini, Jr. et al. | 525/452 |
| 4,331,782 | 5/1982 | Linden | 525/173 |
| 4,375,489 | 3/1983 | Muszynski | 428/36 |
| 4,400,413 | 8/1983 | Emmons et al. | 427/136 |

OTHER PUBLICATIONS

N. S. Estrada, "Paving of Roads and Bridges With Unsaturated Polyesters", Section 20-F, pp. 1-10, Annual Technical Conference, 1970, Reinforced Plastics/Composites Division, The Society of Plastics Industry, Inc.

"Standard Specification for Epoxy-Resin-Base Bonding Systems for Concrete", ANSI/ASTM C 881-78, reprint from American Society for Testing and Materials.

D. W. Akerberg, et al, "Furan Polymer Concrete: The Answer To Corrosion of Concrete", Session 17-E, pp. 1-2, 37th Annual Conference, Reinforced Plastics/Compositions Institute, The Society of the Plastics Industry, Inc., Jan. 11-15, 1982.

Neil S. Estrada, "Unsaturated Polyester Coatings for Bridges", *American Paint & Coatings Journal*, May 2, 1983.

(List continued on next page.)

*Primary Examiner*—Joseph L. Schofer
*Assistant Examiner*—Peter D. Mulcahy
*Attorney, Agent, or Firm*—Fisher, Christen & Sabol

[57] ABSTRACT

Resurfacing surfaces of highways, roads, etc. to provide skid-resistant surface by preparing polymer concrete composition containing a curable polymer composition containing ethylenically unsaturated polymer having carbon-bonded carboxyl groups and/or hydroxyl groups and at least one reactive thickener comprising Group IIA metal oxide or hydroxide or a polyisocyanate; mixing the resulting mixture with aggregate; coating said surface with the resulting composition; compacting and shaping the resulting composition and curing the compacted, shaped composition on said surface.

9 Claims, 1 Drawing Sheet

OTHER PUBLICATIONS

"Polymer Cement Will Fill the U. S. Infrastructure", Chemical Week/Jul. 20, 1983, pp. 10–12.

Von Dr.-Ing. Yoshihiko Ohama, "Recent Development of Polymer Concrete in Japan", *Betonwerk Fertigteil-Technik*, Heft 3, Mar. 1983.

Excerpts (pp. 9, 15–17) from Secs. 8 and 10 of Standards Specifications, State of California; Business, Transportation and Housing Agency, Dept. of Transportation, Proposal and Contract For Construction On State Highway In Fresno and Madeira Counties About 6 Miles North of Fresno, From 0.4 Mile South To 0.3 Mile North Of San Joquin River Bridge, District 06, Route 99, Contract No. 06-225404, 06-FRE, MAD-9-9-31.1/31.6, 0.01/ROA, believed to have been circulated as early as Jul. 1984.

Rough Draft, 1. Ferroni, Feb. 14, 1984, State of California, Department of Transportation for Construction On State Highway In Placer City Near Baxter From 0.2 Mile East Of Drum Forebay Overcrossing To 0.6 Mile West Of Blue Canyon Road Undercrossing Rt. 80 Interstate, Contract No. 03-255334, 03-PLA-80-49.2/52.8, Federal Aid Project IR-080-4(1.24)1.55, Bid opens Apr. 17, 1985.

Joe Grata, "City Bridges Crumbling Despite Influx of Funds", *The Pittsburgh Press*, Section B, Monday, Jun. 4, 1984.

Joe Grata, "Record Amounts of Money Repairing Highways, Bridges", *The Pittsburgh Press*, Sunday, Nov. 18, 1984.

"Caltrans Guards a Big Investment Worth Preserving—With Interest"; Finding the 'Right Stuff' to Renew Interstate 80, by Pat Miller; When the Santa Ana Freeway Closed for Repairs, by Rose Flores; and Fix It Like Before? Not Likely, by Tom Drane, Going Places, pp. 4–11, Jan./Feb. 1985.

Report by Chagrin Valley Industries, Inc., Jan. 25, 1985.

Flyer, "Mobile Concrete Dispenser", of Cemen-Tech Inc. (no date).

Flyer, "The Affordable Portable Concrete Dispenser", of Cemen-Tech Inc., 1983.

L. E. Kukacka, et al, "Introduction to Concrete-Polymer Materials", Apr. 1975, Dept. of Transportation, Fed. Highway Administration, Report No. FHWA-RD-75-507.

L. E. Kukacha, et al, "The Use of Polymer Concrete for Bridge Deck Repairs On the Major Deegan Expressway", Jan. 1975, Federal Highway Administration, Report No. FHWA-RD-75-513.

Frank Fekete, "A Review of the Status of Thickening Systems for SMC, LS-SMC, BMC and LS-BMC Compounds", Section 12-D, pp. 1–10, 27th Annual Technical Conference, 1972, Reinforced Plastics/Composites Institute, The Society of the Plastics Industry, Inc.

Frank Fekete, "New and Novel SMC and BMC Compounds", Section 19-F, pp. 1–18, 28th Annual Technical Conference, 1973, Reinforced Plastics/Composites Institute, The Society of the Plastics Industry, Inc.

R. D. Farris et al, "A thickenable Premium Vinyl Ester for SMC Applications", Section 2-C, pp. 1–11, 35th Annual Technical Conference, 1980, Reinforced Plastics/Composites Institute, The Society of the Plastics Industry, Inc.

J. Greenzweig, et al, "Molecular Weight Control in SMC Polyester Resins", Section 10-D, pp. 1–6, 35th Annual Technical Conference, 1980, Reinforced Plastics/Composites Institute, The Society of the Plastics Industry, Inc.

J. Ferrarini et al, "MDI Products for RIM", Session 6-F, pp. 1–5, 36th Annual Conference, Reinforced Plastics/Composites Institute, The Society of the Plastics Industry, Inc., Feb. 16–20, 1981.

Roy S. Rapp, "Hybrid Isophthalic Polyester Urethanes", Session 8-E, pp. 1–6, 37th Annual Conference, Reinforced Plastics/Composites Institute, The Society of the Plastics Industry, Inc., Jan. 11–15, 1982.

E. J. Thompson et al, "Isocyanate Thickened Sheet Molding Compound", Session 1-A, pp. 1–6, Reinforced Plastics/Composites Institute, The Society of the Plastics Industry, Inc., Jan. 11–15, 1982, 37th Annual Conf.

Michael Kallaur et al, "A Novel Thermosetting Acrylic Resin System for Improved SMC Applications", Session 9-B, pp. 1–4, 38th Annual Conference, Reinforced Plastics/Composites Institute, The Society of the Plastics Industry, Inc., Feb. 7–11, 1983.

H. R. Edwards, "Handling and Physical Properties of Hybrid Polyesters", Session 8-C, pp. 1–7, 39th Annual Conference, Reinforced Plastics/Compsites Institute, The Society of the Plastics Industry, Inc., Jan. 16–19, 1984.

TIME DELAYED THICKENING SLUMP-RESISTANT POLYMER CONCRETE COMPOSITION, METHODS OF REPAIRING CONCRETE SURFACES, CONCRETE STRUCTURES REPAIRED THEREWITH AND ARTICLES OF CONSTRUCTION COMPRISING A FORMED MASS OF SAID COMPOSITIONS IN CURED CONDITION

This application is a continuation of prior U.S. application Ser. No. 689,731 filing date Apr. 24, 1991 which is a continuation of application Ser. No. 538,697 filing date Jun. 18, 1990 which is a continuation of application Ser. No. 408,953 filing date Sep. 18, 1989 and which is a continuation of Ser. No. 220,963, filed Jun. 16, 1988, and which is a continuation of Ser. No. 941,073, filed Dec. 12, 1986, all abandoned.

BACKGROUND OF THE INVENTION

1. Field of the Invention

This invention relates to polymer concrete compositions and methods for repairing or resurfacing concrete surfaces, such as, roads, bridges, decks, runways, etc., and, more particularly, is directed to slump-resistant, curable polymer concrete compositions suitable for rolling onto a concrete surface to resurface it and to methods for applying a polymer concrete surface to concrete surfaces of roadways, runways, sidewalks, floorings, roof decks, water tanks, reservoirs, swimming pools, retaining ponds, dams, median barriers, bridges, buildings and other concrete structures.

2. Prior Art

The sealing of deteriorated concrete or asphalt-concrete or latex-concrete road surfaces, pavements, bridge decks, malls, garage decks, airport runways and ramps, etc., and the provision of a new durable wear surface cannot be readily accomplished through the use of conventional paving materials such as concrete, latex-concrete or asphaltic-concrete. Various synthetic resin systems have been evaluated as sealers and as binders for wear courses in attempting to resolve this problem. Epoxy resins, acrylic resins, urethanes and modified urethanes and unsaturated polyester resins have been investigated under a variety of conditions with limited success.

Work on developing suitable polymer concrete type material for paving roads and bridges has been continuing for over 25 years. A paper by N. S. Estrada entitled "Paving of Roads and Bridges With Unsaturated Polyesters" (Section 20-F, pages 1-10) was presented before the 25th Annual Technical Conference, Reinforced Plastics/Composites Division of The Society of Plastics Industry, Inc. in 1970 and dealt with a review of work done and the shortcomings of the approach used. This work covered "broadcasting" sand over liquid resin applied to highways and bridges. Illustrative prior art polymer concrete compositions are also described in U.S. Pat. Nos. 3,575,785; 4,375,489 and 4,400,413 and the references cited therein. They comprise a resin or polymer, e.g., a vinyl ester resin (U.S. Pat. No. 4,375,489) or an acrylate resin (U.S. Pat. No. 4,400,413), an inert particulate material, e.g., sand or aggregate, and a curing agent.

A limiting characteristic of the prior art systems is the tendency of the polymers or resins or components thereof, e.g., unsaturated polyester and unsaturated monomer such as styrene, to run off the surface being coated, to run downgrade on a sloped surface, and/or to separate from the aggregate, e.g., sand, which is a necessary component of polymer concrete compositions. Because of their loose, runny characteristics, the prior art polymer concrete materials cannot be trucked and must be prepared on-site, i.e., the lane adjacent to the lane being resurfaced must be used for the mixing and metering equipment and supply vehicles which are on the move to keep up with the paver. As a consequence, for each lane being resurfaced, two lanes are taken out of service, the one being resurfaced and the one next to it. In order to resurface one lane of a two-lane highway with polymer concrete, the entire highway would have to be taken out of service, which in the usual case in unacceptable. In resurfacing a single lane of a busy multiple lane highway, the loss of two lanes for even short periods results in traffic tie-ups and consequent hazardous conditions. Also, it has been estimated that 25% of the cost of highway work is devoted solely to traffic control devices and procedures, so that the less traffic that needs to be diverted, the lower will be the cost of the resurfacing job. The polymer concrete compositions of this invention, on the other hand, can be prepared in a convenient off-site location and trucked with essentially no leakage to the lane being repaired, avoiding the need to take any additional lanes out of service, and, thus, closely resemble the systems currently used to lay down asphalt wherein only the lane being resurfaced need be closed to traffic.

Attempts to adjust the rheology of the prior art systems, for example, by adding a material that increases the viscosity and thereby retards or eliminates run-off or separation are not successful. U.S. Pat. No. 4,400,413 (Col. 6, lines 55-58) teaches the addition of thickening or rheological control agents. But, the addition of such agents to the polymer concrete composition presents the additional problem of making extremely difficult, or preventing, the uniform distribution of the components throughout the polymer concrete composition and/or the adequate wetting out of the aggregate with the curable polymer or resin essential for bonding the aggregate together and to the surface being repaired. If the viscosity increasing agent is added to the polymer-catalyst mix, before mixing with aggregate, it is extremely difficult, if not impossible, because of the resulting increase in viscosity, to suitably wet-out the aggregate. Prolonged mixing is ruled out if the system is active because of the presence of the curing catalyst. If the curing catalyst is added last, the increased viscosity of the system caused by the presence of the viscosity increasing agent prevents uniform distribution of the catalyst and results in an uneven cure such that those portions of the composition containing little or no catalyst cure too slowly or not at all and those portions containing too much catalyst cure prematurely. Non-uniform distribution of the components of the polymer concrete composition renders it extremely difficult or impossible to control the timing of the steps in preparing the mix and applying it to the surface being repaired and obviously results in a coating having non-uniform physical strength properties which is unacceptable from a structural standpoint.

It is well known in the sheet molding compound (SMC) prior art and the bulk molding compound (BMC) prior art to provide molding compounds having time-delayed thickening action by the use of Group IIA metal oxides or hydroxides or polyisocyanates. However, none of these compositions are suitable for use as slump-resistant, curable polymer concrete composition suitable for coating or rolling onto a concrete surface to resurface same and none of previously known SMC or BMC compositions contain aggregate, e.g., crushed stone, gravel or sand, which is necessary for providing the strength, traction, wearability and weatherability required for resurfaced concrete surfaces.

None of the prior art identified above and no prior art is known which teaches the use of a delayed thickening system such that the components of a polymer concrete composition containing aggregate can be readily and uniformly mixed and the aggregate can be wetted out by the curable polymer at relatively low viscosities yet thicken at a predetermined time after or during application to a concrete surface to provide a low or no slump, low odor system which can be easily worked and shaped, such as by troweling, spreading, rolling, etc., and which does not result in the curable polymer running off the surface being repaired, running downgrade on a sloped surface, or separating from the aggregate.

SUMMARY OF THE INVENTION

This invention covers low- or no-slump polymer concrete compositions or other polymer aggregate compositions that can be handled like asphalt, blacktop and macadam products. The polymer concrete compositions of this invention are time-delay thickened or co-reacted polymer concrete compositions and can be controlled in a putty, plastic-like condition and applied utilizing the same equipment as presently used. That is, they can be laid down as bases, overlays or patches by dumping the mix in a predetermined thickened consistency to the surface of a previously shot-blasted, scarfed, sand-blasted and cleaned road, pavement, pothole, bridge deck, drive, runway, ramp, mall, etc., which was previously sealed with a primer such as a specially formulated 100% reactive sealer containing an unsaturated polyester, modified polyester and/or modified unsaturated polymer. The thickened, advanced, B-staged or co-reacted pre-catalyzed, natural or precolored polymer overlay composition of this invention is then rolled by roller under presssure to the preconditioned base surface in the same manner as asphalt, blacktop or macadam. Other mechanized ways of applying the overlay presently utilized can be modified and used. This invention also provides cements, mortars, grouts, patching compounds, coating, putties and sealants. These overlays or polymer type surfaces can be cured by room temperature catalysts, high temperature catalysts, alone or in conjunction with ultra violet activation, electrical DC/AC resistance heating, external heat, solar heat, pressure, pressure/heat/accelerators and other type polymerization promoting sources such as micro-wave, photosensitizers, infra-red, electron beam (EB) and radio-frequency.

The concept of this invention providing thickenable polymer concrete compositions or polymer aggregate compositions can utilize almost all reactive saturated and unsaturated polymers including copolymers, homopolymers, terpolymers and alloys or blends. This concept covers all suitable combinations of reactive monomers, including difunctional monomers, trifunctional monomers, multifunctional monomer alone or in combination with the base resins or combinations of base resins hereinafter described. The main theme of this invention is the provision of a time-delayed thickening system that advances the viscosity (not the cure) of the composition with time in a controllable manner.

The time-delayed thickening systems of this invention provide low viscosities in the early stages to facilitate uniform mixing of all components and advance the viscosity of the systems to provide polymer concrete compositions in which all the components are uniformly distributed throughout the compositions, and the aggregate, e.g., sand, is adequately wetted out, to provide a non-flowing or semi-solid consistency in a controllable time period. The thickened, non-flowing or semi-solid material then can be placed and formed into the desired configuration by means of a screen and roller, a slip-form paver or other suitable equipment. The polymer concrete compositions of this invention, after mixing, can be rapidly and controllably thickened or advanced in viscosity to a low slump or zero slump consistency before the polymer concrete composition cures or is cured to a thermoset state. The thickening time, counting from the time of mixing, can be controlled to be less than one minute up to two hours or longer, although thickening times of about 30 minutes to 120 minutes are preferred.

The unique properties of the polymer concrete compositions of this invention are of great value in the resurfacing of heavily traveled highways because they can be prepared at a relatively stationary, off-site location and trucked without substantial leakage to the locations where the highway is being resurfaced. Preparation of the polymer concrete compositions at a stationary, off-site location has many advantages, not the least of which is the ability to more closely monitor and control the properties and quality of the compositions. Additionally, it is not necessary to tie up a second traffic lane which reduces potentially hazardous driver frustrations and reduces the need for special traffic control devices, personnel and procedures. The thickening time, gelling time and curing time of the novel compositions can be adjusted to accommodate the travel time from the off-site preparation center to the job-site on the highway so that the compositions are coalescent but friable and substantially ungelled and uncured from the time they are loaded onto the truck through the time they are dumped into the paver and spread on the road surface. The novel compositions can be fed to a two-lane paver in sufficient quantities that two lanes of highway can be resurfaced at the same time.

Another important advantage of off-site, i.e., off-highway, preparation is the ability to better control fumes and odors such as styrene vapors during preparation. Once thickened, the novel polymer concrete compositions are much less odorous.

DESCRIPTION OF THE INVENTION

The slump-resistant, curable polymer compositions of this invention comprise a mixture of:

(a) 5 to 95 wt. % of an aggregate at least 20% of the particles of which have a minimum dimension of 1/16 inch or greater, (b) 5 to 95 wt. % of a curable polymer composition containing an ethylenically unsaturated polymer containing carbon, hydrogen and oxygen in the molecule and carbon-bonded carboxyl groups or carbon-bonded hydroxyl groups or both in the molecule, (c) an effective amount of a curing catalyst effective to initiate the curing of said polymer, and (d) at least one reactive, time-delay thickener comprising (1) a Group IIA metal oxide or hydroxide in the amount of 0.1 to 20 equivalents per carbon-bonded carboxyl group of said polymer, said Group IIA metal oxide or hydroxide being reactive with said carboxyl groups of said polymer to thicken said polymer concrete composition and/or (2) a polyisocyanate in the amount of 0.1 to 10 equivalents per carbon-bonded hydroxyl group of said polymer, said polyisocyanate being reactive with said hydroxyl groups of said polymer to thicken said polymer concrete composition.

FIG. 1 is a schematic drawing illustrating the application of this invention to the paving of highways, runways, parking areas and the like. Curable polymer composition is pumped in measured proportions from a tank 1 to a liquid mixer 2 which can be a static mixer or one equipped with rotating vanes or an auger. Catalysts, such as, methyl ethyl ketone peroxide, cumene hydroperoxide and like, and/or promoters, such as, dimethyl aniline, diethyl aniline, dimethyl acetamide, cobalt naphthenate, cobalt octoate, and the like, are metered into mixer 2 from a tank 3. Modifiers, such as, polyvinyl acetate, polymethyl methacrylate, polystyrene, and the like, and special additives, such as, silane compounds, wetting agents (BYK or Surfanyl), air release, defoamers and the like, are pumped in measured amounts from tanks 4 and 5, respectively, into mixer 2. If desired, colors can also be added along with the additives. The time-delay thickener or thickeners, e.g., MgO, CaO, MgOH, polyisocyanates, etc., are pumped in metered amounts into the mixer far enough upstream from the discharge end of the mixer 2 to provide a uniform mixture of the materials metered into mixer 2.

The mixture is discharged from mixer 2 into a suitable concrete mixer 7 and aggregate is fed from a hopper 8 into the concrete mixer 7 in proportioned amounts described in more detail hereinafter. The concrete mixer can be of any suitable type, such as, Cemen-tech Inc. mobile and portable concrete dispensers, high-speed augers, conventional rotating concrete mixers and the like.

The concrete mixer 7 provides a uniform mixture of aggregate and curable polymer composition, time-delay thickener mixture which is delivered to paver 8 which applies, and spreads it on the highway surface 9. A preferred paver is the Gomaco GP-2500 full width slip form paver which is provided with as many as sixteen hydraulic vibrators each with its own controllable circuit, that provides adequate vibrating capacity for high volume operations and for fine tuning under a wide variety of conditions. The width applied can be 13 feet and the paver has the capability to pave 25 feet widths with continuous vibration to uniformly apply the thickening, catalyzed, polymer-aggregate mix. A hydraulically powered reversible split auger system moves the thickening, catalyzed polymer concrete in both directions. Material from the auger is handled so quickly that the polymer concrete aggregate delivery is the only production limiting factor. The rate of application can be as fast as approximately 6 feet per minute. Other pavers such as the Bidwell and Barber-Greene can also be used successfully. Another type paver, the slip form paver (in this case the Gomaco 165B slip form paver), can also be used to pave the highway surface and employs a flat pan instead of vibrating screeds to apply and work the thickening catalyzed polymer concrete aggregate into the desired form and free of porosity and air entrapment. The slip form paver comes in flat pan sizes of 12'×4', 12'×3', 12'×2', 24'×2', and 24'×4' sizes that vibrate to move the mix into the corners, cracks and holes in the highway surface 9. The paver 8 provides a layer 10 on the highway surface 9 having any desired thickness, e.g., 1/16 inch to 6 inches or more, preferable 1 to 4 inches. A roller 11 of any suitable type compacts the layer 10 of curable polymer concrete composition on the highway surface. Tamping and troweling can also be used if desired.

Alternatively, the uniform mixture of aggregate and curable polymer composition, time-delay thickener mixture from the concrete mixer 7 is loaded onto dump trucks (not shown) for hauling to the highway surface being resurfaced where it is dumped into the paver 8 for spreading onto the highway surface 9. This arrangement of the present invention permits off-site preparation at a convenient out-of-the-way location within a short truck drive to the application site, providing great advantages in the control of quality and properties of the polymer concrete surface.

In another alternative, the curable polymer composition, time-delay mixture produced by the liquid mixer 2 can be dumped into and spread by the paver without first mixing it with aggregate and the aggregate can be broadcast over the surface of the spread mixture before rolling and tamping.

FIG. 1 also generally correlates the timing of the chemical reactions of the thickening and curing polymer concrete composition from the time the time-delay thickener is added from tank 6 to liquid mixer 2 until it is cured adequately to support traffic. In the example illustrated the novel polymer concrete composition is fully thickened within 15 minutes after adding the time-delay thickener which is ample time to permit mixing with the aggregate in concrete mixer 7 and completion of the paving operation of paver 8. The curable polymer composition in the polymer concrete mix begins to increase in viscosity upon addition of the time-delay thickener but is of sufficiently low viscosity as to adequately wet out the aggregate in the concrete mixer 7 and is still sufficiently low to adequately wet out the highway surface 9 when applied by the paver 8. By the time the thickening, curable polymer concrete composition is applied to the highway surface, however, it has a sufficiently high viscosity to resist running off or settling of the aggregate. By the time it is compacted by the roller 11 it is substantially fully thickened to be able to resist squeezing out of polymer composition by the weight of the roller. The present invention, as more fully described hereinafter, allows for the shortening or lengthening of the thickening time to the fully thickened condition thereby allowing for lower viscosity when the polymer composition contacts the aggregate or the highway surface to provide more wetting out, if insufficient, or allowing for higher viscosity when it contacts the highway surface to provide more resistance to settling of aggregate or run-off of polymer compositions.

The present invention thus provides a system wherein the viscosity of the curable polymer composition is low enough to adequately wet out the aggregate and road surface when contacted therewith and is sufficiently high or thick after it has been applied to the road surface to avoid settling out of the aggregate, running off of the polymer composition, or separation of the aggregate and polymer composition. The present invention also permits compacting the polymer concrete composition after it has been spread on the highway surface without squeezing out the polymer composition or causing it to rise to the surface. As a result of this invention the overlay of polymer concrete composition has a more uniform distribution polymer composition contributing to a more uniform strength throughout the overlay and more uniform control of shrinkage of the overlay which contributes to a stronger bond of the overlay to the highway surface. In addition, higher viscosities in the overlays of the present invention results in decreased evaporation of components such as styrene, that is less fuming, so that the styrene performs its function of copolymerizing in the polymer concrete composition and does not escape into the atmosphere where it can cause a health hazard. Furthermore, the thickening process of the present invention permits the provision of longer gel times, i.e., longer times before the polymer composition gels. This permits longer and more controllable processing times, e.g., for rolling compacting or shaping. This in turn allows the applicator more options in the choice of processing techniques and equipment and permits the selection of more cost-effective systems.

Group II metal oxides and hydroxides useful in the curable concrete compositions of this invention include magnesium oxide and hydroxide, calcium oxide and hydroxide, zinc oxide, barium oxide and hydroxide, beryllium oxide and hydroxide and suitable combinations thereof. Group IIA metal oxides and hydroxides are preferred. The Group IIA metal oxide or hydroxide is used in amounts of 0.1 to 20, preferably 1 to 4, most preferably 0.8 to 2.0, equivalents per carbon-bonded carboxyl group of the ethylenically unsaturated polymer. The presence of water in the mixture of metal oxide or hydroxide and curable polymer composition catalyzes the thickening reaction. Preferably the amount of water in the mixture can vary from 0.1 to 5.0, preferably 0.25 to 5.0, most preferably 0.5 to 4.0, equivalents per equivalent of carboxyl group of the ethylenically unsaturated polymer. Normally, sufficient water is naturally present in the system but can be added if desired in those cases where too little or not water is present.

Any suitable polyisocyanate having more than one isocyanate group reactive with the carbon-bonded hydroxyl group of the ethylenically unsaturated polyester resin of the curable polymer compositions employed in the present invention can be used. Illustratively, useful polyisocyanates include toluene diisocyanate (TDI), 4,4'-diphenylmethane diisocyanate (MDI) such as Upjohn Isonate ® 240, trans 1,4-cyclohexane diisocyanate, MDI modified with small amounts of polycarbodiimide adducts (Upjohn Isonate ® 143L), other modified MDI such as Upjohn Isonates ® 181, 191, and 240, and polymeric MDI's which have the formula

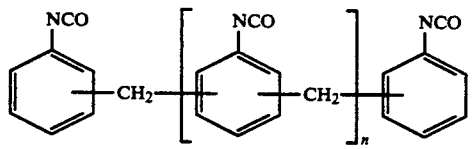

wherein n is an integer of 1–7 such as Upjohn PAPI ® 135. The amounts of polyisocyanate used are widely variable, e.g., 0.1 to 10, preferably 0.1 to 8, most preferably 0.25 to 4, equivalents of isocyanate group per carbon-bonded hydroxyl group of the ethylenically unsaturated monomer.

The curable polymer composition used in this invention contains any suitable ethylenically unsaturated polymer which also contains carboxyl groups or hydroxyl groups or both. It is preferred, in addition, that the curable polymer composition also contain an ethylenically unsaturated comonomer which is copolymerizable with the ethylenically unsaturated polymer. Suitable ethylenically unsaturated monomers include styrene, vinyl toluene, ortho-, meta- and parahalostyrenes, e.g., the chlorostyrenes, vinyl naphthalene, the various alpha-substituted styrenes, di-, tri- and tetrahalo(e.g., chloro)styrenes, the acrylic methacrylic and crotonic acid esters including both the saturated alcohol esters and the hydroxyalkyl esters, e.g., methyl acrylate, ethyl acrylate, n-butyl acrylate, 2-ethylhexyl acrylate, benzyl methacrylate, methyl methacrylate, and pentaerythritol triacrylate, diallyl phthalate, diallyl maleate, vinyl acetate, vinyl ether, acrylonitrile, alpha-methylstyrene, alpha-tert.-butylstyrene, and the like. By ethylenically unsaturated comonomer is meant a monomer containing at least one ethylenically unsaturated group reactive with the ethylenic unsaturation of the ethylenically unsaturated polyester. The ratio of ethylenically unsaturated comonomer to ethylenically unsaturated polymer used in the curable polymer compositions of this invention range from 0:100 to 75:25, more preferably from 0:100 to 60:40, and most preferably from 20:80 to 60:40, based on weight.

The most generally available and most economically feasible ethylenically unsaturated polymers for use in the polymer concrete compositions of this invention currently are the ethylenically unsaturated polyester and vinyl ester resin systems. The ethylenically unsaturated polyester resin systems are polymers produced by reacting saturated or ethylenically unsaturated polyols such as diols and triols with saturated or ethylenically unsaturated polycarboxylic acids or anhydrides. Typical polyols used in producing ethylenically unsaturated polyester resins are ethylene glycol, glycerol, neopentyl glycol, propylene glycol, diethylene glycol, dipropylene glycol, trimethylpentanediol, 1,4-butanediol, .1,4-butenediol,dibromoneopentyl glycol, 1,4-cyclohexanedimethanol, 1,4-cyclohexanediol, bisphenol-A, i.e., 2,2-bis(p-hydroxyphenyl) propane, p,p'-bis(ethanolamino)octochloro biphenyl, hydrogenated bisphenol A, propoxylated bisphenol A, hydrogenated bisxylenol, 2,2,4-trimethylpentanediol, 1,4-butanediol, 1,4-butenediol and the like. Typical polycarboxylic acids and anhydrides used in the manufacture of the ethylenically unsaturated polyester resins used in this invention include maleic, fumaric, phthalic, isophthalic, hexahydrophthalic, tetrachlorophthalic, tetrahydrophthalic, tetrabromophthalic, chlorendic, endic, methendic, trimellitic, succinic, adipic, sebacic acids and anhydrides and the like. The ethylenic unsaturation in the polyester resin is usually provided by the use of an ethylenically unsaturated polycarboxylic acid or anhydride in the preparation of the polyester resin. However, the ethylenic unsaturation in the polyester resin can also be provided by using an ethylenically unsaturated polyol with a saturated and/or ethylenically unsaturated polycarboxylic acid or anhydride.

All categories of ethylenically unsaturated polyester resins prepared from condensation or addition type chemical reaction between polycarboxylic acids or anhydrides and glycols or bisphenols will contain —COOH or —OH or both depending on the extent of polymerization carried out. The acid content and hydroxyl content are designated as the acid number and as the hydroxyl number, respectively. The acid number (A.N.) can be converted to weight percent —COOH by calculating the acid equivalent weight of the polyester resin, i.e., by dividing 56,000 by the acid number, for example: 56,000/A.N.=Acid Equiv. Wgt. For example, if A.N.=56, the acid equivalent weight=56,000/56=1000. The % carboxyl group content then is calculated by dividing 45, the molecular weight of a carboxyl group, by the acid equivalent weight. For example, $$\text{wt. \% COOH Content} = \frac{\text{M. Wgt} - \text{COOH}}{\text{Acid Eq. Wgt.}} \times 100 =$$

$$\frac{45}{1000} \times 100 = 4.5 \text{ wt. \% COOH.}$$

In those instances where the polymer composition also contains an ethylenically unsaturated comonomer, the acid number of polymer composition is lower than that of the ethylenically unsaturated polyester resin per se because of the dilution effect of the comonomer. The range of acid number of the polymer composition is from 10 to 60, preferably 20 to 50.

Curable polymer compositions based on ethylenically unsaturated polyester resins thickenable in the present invention by Group IIA metal oxides or hydroxides include the following formulations:

I. Isophthalic Unsaturated Polyester-Styrene

| | Moles | | |
|---|---|---|---|
| | A. General | B. (K6000-5) | C. (K-6101) |
| Reactants | | | |
| Isophthalic Acid (IPA) | 1.0 | 1.0 | 1.0 |
| Propylene Glycol (PG) | 3.0 | 2.15 | 1.73 |
| Dipropylene Glycol (DPG) | 1.2 | — | 0.84 |
| Maleic Anhydride (MAA) | 3.0 | 1.0 | 1.40 |
| Resin Properties | | | |
| Styrene Content, % (approx) | 40 | 40 | 30 |
| Acid No. (Solids)[1] | 31–33 | 20–37 | 20–26 |
| Acid No. (Dilute)[2] | 18–20 | 12–16 | 14–18 |
| Brookfield Visc. cps | 450–500 | 400–500 | 2300–2700 |
| SPI Gel 1% BPO[3] | | | |
| Gel Time, min. | 7.5 | 4–5 | 3–4 |
| Cure Time, min. | 9.0 | 6–7 | 4-1/2–5-1/2 |
| Peak Exotherm °C. (°F.) | 232(450) | 410–440 | 390–410 |
| %-COOH (approx.)[4] | 1.53 | 1.13 | 1.29 |

II. Orthophthalic Unsaturated Polyester - Styrene

| | Moles | | |
|---|---|---|---|
| | A. 1000-25 | B. 2000-25 | C. 3000-25 |
| Reactants | | | |
| Phthalic Anhydride (PAA) | 2.0 | 1.0 | 1.0 |
| Propylene Glycol (PG) | 3.3 | 2.2 | 3.3 |
| Maleic Anhydride (MAA) | 1.0 | 1.0 | 2.0 |
| Resin Properties | | | |
| % Styrene | ~30 | ~30 | ~30 |
| Acid No. (Solids)[1] | 22–28 | 30–37 | 28–30 |
| Acid No. (Dilute)[2] | 13–20 | 15–25 | 21–26 |
| Brookfield | 2300–2700 | 2300–2700 | 2300–2700 |
| Visc., cps | | | |
| SPI Gel 1% BPO[3] | | | |
| Gel time, min. | 3.5–5.0 | 3.0–4.0 | 3.5–4.5 |
| Cure time, min. | 5.0–7.0 | 4.0–6.0 | 4.3–6.0 |
| Peak Exotherm °C. (°F.) | 173–185 | 193–205 | (410–430) |
| %-COOH (approx.)[4] | ~1.33 | ~1.61 | ~1.89 |

III. Tetrachloro-/Testrabromophthalic Unsaturated Polyester Styrene

| | Moles | |
|---|---|---|
| | A. | B. |
| Reactants | | |
| Tetrachlorophthalic Anhydride (TCPA) | 1.0 | — |
| Tetrabromophthalic Anhydride (TBPA) | — | 1.0 |
| Ethylene Glycol (EG) | 2.2 | 2.2 |
| Maleic Anhydride (MAA) | 1.2 | 1.2 |
| Resin Properties | | |
| % Styrene (approx.) | 34 | 34 |
| Acid Number (Solids)[1] | 19–24 | 21–27 |
| Acid Number (Dilute)[2] | 14–18 | 16–20 |
| Brookfield Visc., cps | 400–600 | 400–600 |
| SPI Gel 1% BPO[3] | | |
| Gel time, min. | 3.5–4.5 | — |
| Cure time, min. | 5.5–6.5 | — |
| Peak Exotherm °C. (°F.) | 420 | — |
| %-COOH (approx.)[4] | ~1.29 | ~1.45 |

IV. Bisphenol-Hydrogenated Bisphenol Unsaturated Polyester-Styrene

| | Mole % | |
|---|---|---|
| | A. | B. |
| Reactants | | |
| Bisphenol-A (BP-A) | — | 1.10 |
| Hydrogenated Bisphenol-A (HBP-A) | 0.66 | — |
| Propoxylated Bisphenol-A (PBP-A) | 0.44 | — |
| Maleic Anhydride (MAA) | 1.00 | 1.00 |
| Resin Properties | | |
| % Styrene (approx.) | 50 | 50 |
| Acid Number (Solids)[1] | 33–37 | 33–37 |
| Acid Number (Dilute)[2] | 17–20 | 17–20 |
| Brookfield Visc., cps | 400–600 | 400–600 |
| SPI Gel 1% BPO[3] | | |
| Gel time, min. | 9 | — |
| Cure time, min. | 13 | — |
| Peak Exotherm °C. (°F.) | 390 | — |
| %-COOH (approx.)[4] | 1.49 | 1.49 |

V. Hydrogenated Bis Xylenol Unsaturated Polyester-Styrene

| | Mole % | |
|---|---|---|
| | A. | B. |
| Reactants | | |
| Hydrogenated Bis Xylenol (HBXA) | 2.0 | 2.0 |
| Neopentyl Glycol NPG | 2.0 | 2.0 |
| Tetrahydrophthalic Anhydride (THPA) | — | 1.0 |
| Maleic Anhydride (MAA) | 4.0 | 3.0 |
| Resin Properties | | |
| % Styrene | 40 | 40 |
| Acid No. (Dilute) | 39 | 39 |
| %-COOH Calc. from A.N.(Dilute) | 2.41 | 3.13 |

VI. 1,4 Cyclohexanediol (CHD) Unsaturated Polyester-Styrene

| | Mole % |
|---|---|
| | A. |
| Reactants | |

-continued

| | |
|---|---|
| 1,4-Cyclohexanediol (CHD) | 2 |
| Neopentyl Glycol (NPG) | 2 |
| Tetrahydrophthalic Anhydride (THPA) | 0.5 |
| Maleic Anhydride (MAA) | 3.5 |
| Resin Properties | |
| % Styrene | 40 |
| Acid Number (Dilute) | 33 |
| %-COOH from A.N. (Dilute) | 2.65 |

VII. Tetrahydrophthalic Anhydride (THPA) Unsaturated Polyester-Vinyl Toluene

| | Mole % | | | | |
|---|---|---|---|---|---|
| | A. | B. | C. | D. | E. |
| Reactants | | | | | |
| Maleic Anhydride (MAA) | 2.0 | 2.0 | 2.0 | 2.0 | 2.0 |
| Azeloic Acid (AZA) | 1.0 | 1.0 | — | — | 0.5 |
| Tetrahydrophthalic Anhydride (THPA) | 1.0 | 1.0 | 1.0 | 1.0 | 1.0 |
| Neopentyl Glycol (NPG) | 2.0 | 2.0 | 2.0 | 2.0 | 2.0 |
| Ethylene Glycol (EG) | — | — | — | — | — |
| Cyclohexanedimethanol (CHDM) | 2.0 | 2.0 | 2.0 | 2.0 | 2.0 |
| Succinic Acid (SA) | — | — | — | — | — |
| Adipic Acid (AA) | — | — | 1.0 | — | 0.5 |
| Sebacic Acid (SEA) | — | — | — | 1.0 | — |
| Resin Properties | | | | | |
| % Vinyl Toluene | 40 | 40 | 40 | 40 | 40 |
| Acid Number (Dilute) | 27 | 24 | 22 | 23 | 23 |
| %-COOH Calc. from A.N. (Dilute) | 2.17 | 1.93 | 1.77 | 1.85 | 1.85 |

VIII. Additional Types of THPA Polyester-Vinyl Toluene

| | Moles | | | | | |
|---|---|---|---|---|---|---|
| | A. | B. | C. | D. V7000-15 | E. V7001-10 | F. B118-78 |
| Reactants Components | | | | | | |
| Maleic Anhydride (MAA) | 2.0 | 2.0 | 1.74 | 3.0 | 2.8 | 2.5 |
| Azelaic Acid (AZA) | — | 1.0 | 0.87 | — | — | — |
| THPA | 1.0 | 1.0 | 0.87 | 1.0 | 1.2 | 1.0 |
| CHDM | 2.0 | 2.0 | 1.74 | 2.0 | — | 2.0 |
| Neopentyl Glycol (NPG) | 2.0 | — | — | 2.0 | 2.0 | 2.0 |
| Empol Dimer 1014 (EO) | 1.0 | — | — | — | — | — |
| Ethylene Glycol (EG) | — | 2.0 | — | — | 2.2 | — |
| 2,2,4-Trimethylpentanediol (TMPD) | — | — | 1.91 | — | — | — |
| Adipic Acid (AA) | — | — | — | — | — | 0.5 |
| Resin Properties | | | | | | |
| % Vinyl Toluene | 40 | 40 | 40 | | | |
| Visc., cps | 450 | 500 | 350 | | | |
| Acid Number | 26 | 24 | 40 | | | |
| %-COOH from A.N. (Dilute) | 2.09 | 1.93 | 3.21 | | | |

IX. Additional Types of THPA Polyester-Vinyl Toluene

| | Moles | | |
|---|---|---|---|
| | A. | B. | C. |
| Reactants | | | |
| Neopentyl Glycol (NPG) | 2.0 | 2.0 | 2.2 |
| Ethylene Glycol (EG) | 2.2 | 2.2 | 2.2 |
| Tetrahydrophthalic Anhydride (THPA) | 2.0 | 2.0 | 1.2 |
| Maleic Anhydride (MAA) | 2.0 | 2.0 | 2.8 |
| Resin Properties | | | |
| % Vinyl Toluene (VT) | 40 | 40 | 40 |
| Acid Number (Dilute) | 30 | 31 | 32 |
| Viscosity, cps (40% VT) | 600 | 500 | 1550 |
| %-COOH from A.N. (Dilute) | 2.41 | 2.49 | 2.57 |

X. Dimethyl 1,4-Cyclohexanedicarboxylate (DMCD) Polyester-Styrene

| | Moles | | | |
|---|---|---|---|---|
| | A. | B. | C. | D. |
| Reactants | | | | |
| 1st Stage | | | | |
| Neopentyl Glycol (NPG) | 8.08 | | | |
| DMCD | 3.96 | 3.33 | 4.47 | 5.0 |
| CHDM-S* | — | 6.99 | — | — |
| Propylene Glycol (PG) | — | — | 9.38 | — |
| Ethylene Glycol (EG) | — | — | — | 10.5 |
| 2nd Stage | | | | |
| Maleic Anhydride (MAA) | 3.96 | 3.33 | 4.47 | 5.0 |
| Resin Properties | | | | |
| % Styrene | 40 | 40 | 40 | 40 |
| Acid Number (Dilute) | 10 | 11 | 12 | 20 |
| Mol. Wgt. M̄n | 2000 | 2200 | 2000 | 1700 |
| Viscosity, cps | 400 | 600 | 250 | 250 |
| %-COOH calc'd from A.N. (Dilute) | 0.804 | 0.884 | 0.964 | 1.61 |
| %-COOH calc'd from Mol Wgt. M̄n | 2.25 | 2.05 | 2.25 | 2.65 |

XI. Glycol/Maleate-Fumarate Polyester-Styrene

| | Moles | | |
|---|---|---|---|
| | A. | B. | C. |
| Reactants | | | |
| Propylene Glycol (PG) | 1.1 | 1.1 | — |
| Maleic Anhydride (MAA) | 1.0 | 1.0 | 6.0 |
| Dipropylene Glycol (DPG) | — | — | 6.8 |
| Resin Properties | | | |
| % Styrene | 4.0 | 4.0 | 4.0 |
| Acid No. (Solids) | 28–33 | 28–33 | 5–7 |
| Acid No. (Dilute) | 20–23 | 17–20 | 4–5 |
| Viscosity, cps | 2300–2700 | 400–600 | 2400–2600 |
| Gel Time, min. | 12–14 | — | 4.5–6 |
| Cure Time, min. | 13–16 | — | 6.5–8 |
| Peak Exotherm °C. or °F. | 215–245° C. | — | 395–415° F. |
| %-COOH calc'd from A.N. (Dilute) | 1.84–2.25 | 1.36–1.65 | 0.40–0.56 |
| Commercial (Koppers) | (3700-25) | (3702-5) | 3801-25) |

(1)Acid number of undiluted polyester resin.
(2)Acid number of polyester resin diluted with styrene.
(3)Society of Plastics Industry Test Cure Procedure For Unsaturated Polyester Resins using 1 wt. % benzoyl peroxide catalyst based on resin.
(4)Calculated from Acid No. (dilute).
*As a 68 ± 1% solution of 1,4-cyclohexanedimethanol in methanol The curable polymer compositions described in Tables VII and VIII are described in further detail in U.S. Pat. No. 3,674,727 and additional curable polymer compositions useful in this invention are described in U.S. Pat. Nos. 3,530,202; 3,560,445 and 3,533,999.

In addition, there can be used suitable curable polymer compositions containing 30 to 60 wt. % of an ethylenically unsaturated monomer (e.g., styrene or vinyltoluene) and the balance (40 to 70 wt. %) of an isophthalic/glycol/maleate-fumarate/isocyanate urethane ethylenically unsaturated polyester made by reacting two moles of ethylene glycol with one mole of isophthalic acid to form a stage I intermediate, reacting 2 moles of the stage I intermediate with 1 mole of tolylene diisocyanate to form a stage II intermediate, reacting 1 mole of the stage II intermediate with 1 mole of maleic anhydride to form a stage III intermediate, and reacting 1 mole of the stage III intermediate with 2 moles of maleic anhydride to form the final ethylenically unsaturated polyester. The molecular weights and % COOH of the stage III intermediate and solutions of each (60 wt. %) in 40 wt. % styrene are:

|  | Stage III | Final Polyester |
|---|---|---|
| Calculated Mol. Wt. | 780 | 878 |
| % COOH (undiluted) | 5.77 | 10.25 |
| % COOH (diluted with 40% styrene | 3.46 | 6.15 |

Any suitable glycol can be substituted for ethylene glycol; any suitable dibasic cyclic acid or anhydride can be substituted for isophthalic anhydride; any suitable dicarboxylic acid or anhydride can be substituted for maleic anhydride; and any suitable diisocyanate can be substituted for tolylene diisocyanate.

Additional ethylenically unsaturated polyesters which can be diluted with an ethylenically unsaturated monomer, e.g., styrene, as described herein and used as a curable polymer composition is made by reacting 1 mole of tolylene diisocyanate with 2 moles of ethylene glycol to form a stage I intermediate; and reacting 1 mole of the stage I intermediate with maleic anhydride to form a polyester of the formula:

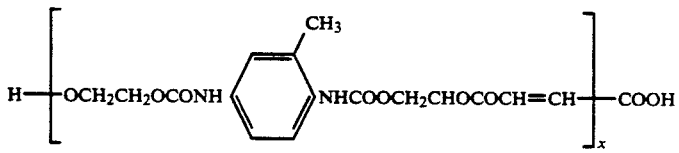

wherein x is initially 1. This polyester can be further heated to increase its molecular weight, i.e., to increase the value of x. The calculated molecular weights, % COOH and % OH for each of five polyesters wherein x is respectively 1 to 5 and the calculated % COOH and % OH of each said polyester are:

| x = | 1 | 2 | 3 | 4 | 5 |
|---|---|---|---|---|---|
| Mol. Wgt., Calc'd. | 396 | 746 | 1096 | 1446 | 1796 |
| %-COOH(Calc'd) MWn | 11.36 | 6.03 | 4.11 | 3.11 | 2.51 |
| %-COOH(40% S) | 6.82 | 3.62 | 2.47 | 1.87 | 1.51 |
| %-OH (Calc'd) MWn | 4.29 | 2.28 | 1.55 | 1.18 | 0.95 |
| %-OH (40% S) | 2.57 | 1.37 | 0.93 | 0.71 | 0.57 |

Additional ethylenically unsaturated polyesters which can be diluted with an ethylenically unsaturated monomer, e.g., styrene, and used as a curable polymer composition is made by reacting 2 moles of tolylene diisocyanate with 1 mole of 1,4-dimethylolcyclohexane to form a stage I intermediate and reacting the stage I intermediate with 2 moles of one of the following unsaturated alcohols:
(A) HOCH$_2$CH$_2$OCOCH=CH$_2$
(B) HOCH$_2$CH$_2$OCOC(CH$_3$)CH=CH$_2$
(C) HOCH(CH$_3$)CH$_2$OCOCH=CH$_2$
(D) HOCH(CH$_3$)CH$_2$OCOC(CH$_3$)=CH$_2$
providing final polyesters A, B, C and D having calculated molecular weights of 724, 754, 752 and 780, respectively.

Vinyl ester resins are also useful as curable polymer compositions in this invention. These vinyl ester resins contain an ethylenically unsaturated monomer such as styrene or vinyltoluene in amounts ranging from 30 to 60 wt. % and the balance of 40 to 70 wt. % of an ethylenically unsaturated polyester such as is produced by reacting one mole of hydroxyethyl acrylate and 0.97 mole of maleic anhydride to a % COOH of about 20.95% (21.03% is theoretical), reacting the resulting stage I polymer with 0.45 mole of

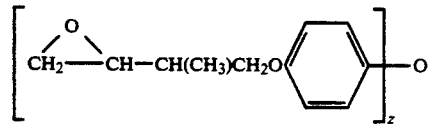

to form a stage II intermediate having a % COOH of about 0.52% (0% is theoretical), reacting the stage II intermediate with about 0.485 mole of maleic anhydride to provide a stage III intermediate having a % COOH of about 5.53 (5.94% is theoretical) and diluting the stage III intermediate with 40 wt. % styrene to provide a curable polymer composition containing 60 wt. % of stage III intermediate and about 3.3% COOH (3.56% is theoretical). The amount of maleic anhydride used to react with the stage II intermediate to form the stage III intermediate can be adjusted to adjust the % COOH in the final curable polymer composition as shown by Table XII below:

TABLE XII

| Curable Polymer comp. | % COOH | Maleic Anhydride Used In Stage III |
|---|---|---|
| A | 3.3 | 0.50 |
| B | 0.9 | 0.20 |
| C | 2.1 | 0.35 |
| D | 4.2 | 0.65 |
| E | 6.5 | 0.95 |
| F | 2.7 | 0.50 |
| G | ~0 | 0.00 |

In each case, the moles of maleic anhydride (MAA) used correspond approximately to the conversion of pendant hydroxyl groups to pendant half ester groups, e.g., Composition A (0.5 mole MAA) corresponds to about 50% conversion; Composition B (0.35 mole MAA) corresponds to about 35% conversion, Composition G (0% MAA) corresponds to about 0% conversion.

Ethylenically unsaturated polyesters of the type of curable polymer Compositions A through G described above are described in U.S. Pat. Nos. 3,221,043; 3,256,226; 3,301,743; 3,317,465 and 3,373,075. Any ethylenically unsaturated polyesters described in the above-mentioned patents can be used in the present invention.

Thickening responses with MgO were noted with Composition A (~5.3% —COOH). At 70° C. with 2 equivalents of MgO per equivalent —COOH were added. After blending for 60 seconds, one equivalent of water (H₂O) per equivalent of —COOH was added, with 15 seconds noticeable thickening occurred and complete thickening occurred in 1.1 minutes. Similar responses were noted for zinc oxide, calcium hydroxide, magnesium hydroxide and calcium oxide. These resins were tack-free in a similar period of time.

Using Composition D (about 4.2% —COOH), the effect of the number of equivalents of MgO per equivalent of —COOH was determined. Equivalents of MgO/—COOH varied from 0.8/1.0 to 2.0/1.0 and the tests run at 70° C. with one equivalent of H₂O per equivalent of —COOH present in all cases. A dramatic decrease in time of thickening occurred as the equivalent of MgO/—COOH approached 1/1. The results are shown in Table XIII.

TABLE XIII

| Equivalent of MgO per equivalent of —COOH | Thickening time, min. |
|---|---|
| 0.8/1 | 20 |
| 0.9/1 | 2.75 |
| 1/1 | 1.50 |
| 1.5/1 | .75 |
| 2/1 | .50 |

In a similar manner, the effect of higher loadings of MgO was determined with resin Composition C (about 2.1% —COOH), by varying the equivalent of MgO/—COOH from 4/1 to 8/1. The results are summarized in Table XIV.

TABLE XIV

| Equivalent of MgO per equivalent of —COOH | Thickening time, min. |
|---|---|
| 4/1 | 0.25 |
| 8/1 | 0.25 |

The effect of varying the equivalent of H₂O per equivalent of —COOH (H₂O/—COOH) while holding the equivalent of MgO constant was run on Composition A (about 3.3% —COOH). These results were obtained at 80° C. and with 2 equivalents of MgO per equivalent of —COOH present in all cases. Table XV shows the results.

TABLE XV

| Equivalent H₂O/ equivalent —COOH | Tack-Free Time, Min. |
|---|---|
| 0.5/1 | 3.25 |
| 1/1 | 2.5 |
| 2/1 | 2.25 |
| 3/1 | 2.75 |
| 4/1 | 3.75 |

Varying the amount of MgO will also change the rate of thickening.

By blending Compositions B and D, mixtures were prepared wherein the acid concentration (% —COOH) was varied from about 0.9% to 4.2% and the thickening time as a function of % acid content (% —COOH) was evaluated. All tests were made with 2 equivalents of MgO per equivalent of —COOH, one equivalent of H₂O per equivalent of —COOH and at a temperature of 70° C. A decrease in thickening time was found as the % —COOH increased up to 2 to 3%. Additional improvement in thickening rate occurred as % —COOH was increased above 3%. Preferably, the acid content (% —COOH) should be above 1% by weight.

When phthalic anhydride or tetrahydrophthalic anhydride replaces MAA in an amount sufficient to obtain 40% conversion of hydroxyl groups, similar thickening characteristic is noted. Different monomers can be used in place of styrene, such as vinyl toluene, methyl methacrylate, chlorostyrene, HEA, HPA, and others and still provide rapid thickening.

Additional vinyl ester resins that are useful as curable polymer compositions in this invention contain about 40 wt. % styrene and about 60 wt. % of an ethylenically unsaturated polyester produced by reacting 2 moles of methacrylic acid and 1 mole of

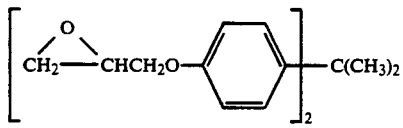

to form a stage I intermediate having 0% COOH, reacting the resulting stage I intermediate with 1 mole of maleic anhydride to form a stage II intermediate having about 7.8% COOH, and, optionally, reacting the stage II intermediate with 1 additional mole of maleic anhydride to form a stage III intermediate having about 12.71% COOH. Styrene (40 wt. %) added to the stage II intermediate provides a curable polymer composition having about 4.7% COOH. Styrene (40 wt. %) added to the stage III intermediate provides a curable polymer composition having about 7.63% COOH.

The higher molecular weight diepoxides such as those described below can be used with styrene or other ethylenically unsaturated monomer to provide higher molecular weight curable polymer compositions:

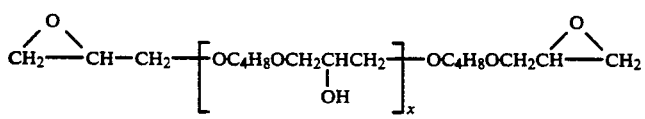
(A)

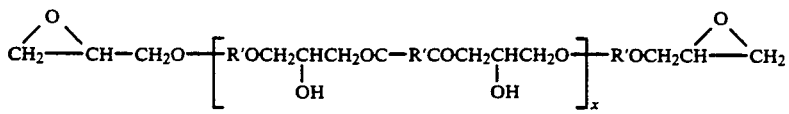
(B)

-continued

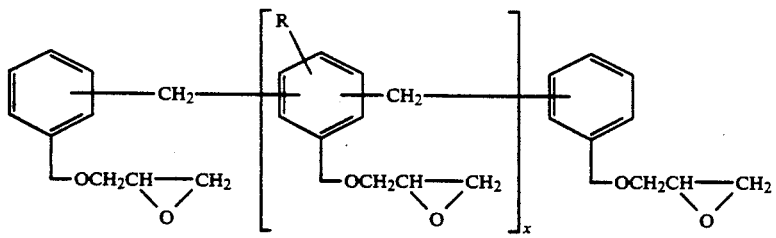
(C)

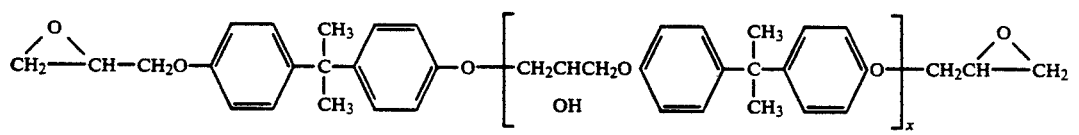
(D)

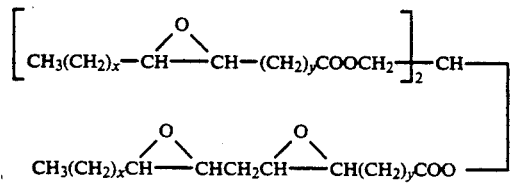

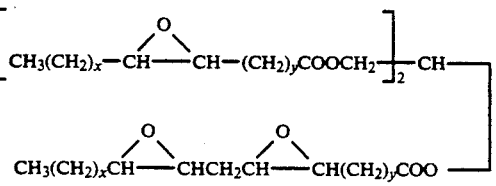
(E)

wherein R is a monovalent hydrocarbon group, R' is a divalent hydrocarbon group, and x and y are each integers of 0 or more, e.g., 0–10.

The above-mentioned ethylenically unsaturated polyesters can be blended with each other and/or with other reactive polyesters or monomers to adjust the % COOH and the % OH as desired to provide the desired thickening action upon mixture with the Group IIA metal oxides or hydroxides. The % COOH in the curable polymer compositions (containing the ethylenically unsaturated polyester and ethylenically unsaturated monomer) used in this invention can be as low as 0.1% and as high as 10% and preferably is in the range of 0.5 to 5%, most preferably 1 to 3% based on the weight of the curable polymer composition.

The non-maleate or non-phthalate modified vinyl ester resins can be blended with each other for reactivity to either oxide, hydroxide or isocyanate thickening response. The main capability here is controlling the —OH or —COOH content of systems as explained hereinabove.

The above systems can have added to them ethylenically unsaturated carboxylic acids such as acrylic, methacrylic, crotonic, etc., to give the desired —COOH values. On reaction the ethylenic double bond of the carboxylic acid combines with the other reactive monomers and polymer.

The main function is to utilize the metal oxide or hydroxide, wherein the metal is selected from Group II of the periodic table, in an amount sufficient to provide at least 0.25 equivalents per equivalent of carboxylic acid (—COOH) and preferably 0.75 equivalents per equivalent (—COOH), and wherein water in an amount sufficient to provide from at least about 0.10 to about 5 equivalents of water per equivalent of —COOH and preferably 0.25 to 5 equivalents per equivalent of —COOH is present. Usually water in these amounts is already in the system and need not be added. Overall water in the amount of 0.5 to 10, preferably 1 to 5, equivalents per equivalent of COOH and Group IIA metal oxide or hydroxide in the amount of 0.5 to 20, preferably 0.75 to 10, most preferably 2 to 5 or 10, equivalents per COOH equivalent can be used in this invention. At a ratio of 2 MgO equivalents per COOH equivalent, the optimum ratio of $H_2O$ equivalents to COOH equivalents has been noted to be about 2:1. It has been noted that the thickening time decreases as the ratio of MgO équivalents to COOH equivalents increases towards 1:1 and then increases above 1:1 through an MgO equivalents to COOH equivalents ratio of 2:1. The rate of thickening can be increased or decreased by adjusting the amounts of Group II metal oxide or hydroxide and water relative to the % COOH of the curable polymer composition and/or by the addition of other accelerators, organic or inorganic, as is known to the skilled worker. Increasing the molecular weight of the ethylenically unsaturated polyester in the curable polymer compositions used in this invention or blending high molecular weight additives therewith also can promote faster thickening. Heat, i.e., higher temperatures can also promote faster thickening. The addition of certain filler types at certain loadings can also promote faster thickening. The effective factor in increasing the thickening rate is increased percentages of COOH in the ethylenically unsaturated polyester.

Thickening curable polymer compositions of some of the types described above are disclosed in U.S. Pat. No. 3,466,259; 3,548,030; 3,674,893 and 3,857,812 and any suitable curable polymer composition disclosed in these patents can be used in this invention.

Curable polymer compositions based on ethylenically unsaturated polyester resins thickenable in this invention by polyisocyanates contain active hydrogens in the form of carbon-bonded hydroxyl groups in the resin molecule. Some polyester resins of this type have been described hereinabove and also contain carbon-bonded carboxyl groups in the resin molecule. Additional types of polyester resins having carbon-bonded hydroxyl groups are described hereinbelow. Any suitable ethylenically unsaturated polyester resin having carbon-bonded hydroxyl groups in the amount of 0.5 to 7.5%, preferably 1 to 5%, most preferably 1.5 to 3.5% based on the weight of curable polymer composition (i.e., the polyester resin and ethylenically unsaturated monomer) can be used in the present invention.

The ratio of isocyanate functionality to active hydrogens in the polyester heavily influences the properties of the resulting hybrid resin. This ratio is expressed as the isocyanate index; and index of 40 indicates that the number of —NCO groups is equivalent to 40 percent of the active hydrogens, principally —OH groups, in the polyester. The hydrid concept utilizes a hydroxyl-terminated unsaturated isopolyester or standard orthphthalic, terephthalic, maleate polyester by normal esterification techniques to very low acid number. This iso- or standard polyester is then blended with isocyanate for thickening action by chain extension or chain branching (polyisocyanate, poly-branched isocyanate prepolymers) and with styrene (or other reactive mono, di or multi-functional ethylenically unsaturated monomers) for crosslinking.

By varying the amounts and types of polyisocyanates a wide range of cured polymer properties can be achieved. The chain extension between polyester and polyisocyanate eliminates the need for non-reactive mineral thickening agents used commonly in polyesters for other uses. Glycol excesses are calculated to yield specific equivalent weights for the hydroxyl-terminated polyesters. With rare exceptions, primary hydroxyl-containing glycols are employed. An esterification catalyst, butyl stannic acid, can be used at 0.1 wt. % of the ethylenically unsaturated acid, e.g., the isophthalic acid, especially to achieve acid numbers below 1 for the polyester. Finished polyesters were of an acid number less than 5 and were diluted in styrene monomer. Inhibitor levels of 200 parts per million (ppm) hydroquinone and 50 ppm of parabenoquinone stabilize the resins especially since polyesters in lower molecular weights are found to be less stable than conventional resins. The polyisocyanate can be varied, but, as regards TDI and MDI, little differences in physical properties were noted for the monomeric and polymeric forms in final systems.

Tables XVI to XIX illustrate a variety of ethylenically unsaturated polyester resins of the hydrid type that can be used in this invention. The hydroxyl numbers given can be converted to wt. % OH by calculating the polyol equivalent weight by dividing 56,100 by the hydroxyl number and then dividing 17 (the molecular weight of the hydroxyl group) by the polyol equivalent weight and multiplying by 100. For example, the % OH for a resin having a hydroxyl number of 111 is calculated as follows:

$$\% \text{ OH} = 17 \times \frac{111}{56,100} \times 100 = 3.37\%$$

TABLE XVI

| Fast Thickening System Material | |
|---|---|
| Isophthalic Acid, moles | 1.0 |
| Maleic Anhydride, moles | 1.0 |
| Diethylene glycol, moles | 2.64 |
| Styrene, wt. % | 35 |
| Acid number, solids | 4.2 |
| Hydroxyl number, solids | 111 |
| Brookfield Visc., cps (25° C.) | 248 |
| SPI Gel Test (1% BPO 80° C.) | |
| Gel time, min/sec | 4:00 |
| Cure time, min/sec | 7:35 |
| Peak exotherm °C. Theoretical | 180 |
| Equiv. Wgt., solids | 383 |
| Unsaturation/1000 g Solids | 2.04 |
| Aromaticity, wt. % solids | 33.9 |

Dilution to 44% styrene and using 100 isocyanate Index with TDI (Toluene Diisocyanate) gave fast thickened tack free, formable mix within 120 minutes.

TABLE XVII

| Resin Designation | TG-181 | NET-224 | TG-182 | NET-226 |
|---|---|---|---|---|
| Isophthalic Acid, moles | 1.0 | 1.0 | 1.0 | 1.0 |
| Maleic Anhydride, moles | 2.0 | 2.0 | 2.0 | 2.0 |
| Diethylene Glycol, moles | 3.92 | 2.92 | 1.96 | — |
| Ethylene Glycol, moles | — | 1.5 | 1.96 | 1.96 |
| Neopentyl Glycol, moles | — | — | — | 1.96 |
| Styrene, Wt. % | 33 | 35 | 33 | 35 |
| Acid Number, solids | 2.8 | 1.7 | 4.0 | 3.9 |
| Hydroxyl Number, solids | 130 | 140 | 151 | 171 |
| Brook. Visc. cps (25° C.) | 410 | 246 | 248 | 385 |
| SPI Gel Test (Std) | | | | |
| gel time, min/sec | 7:15 | 6:55 | 5:05 | 7:00 |
| cure time, min/sec | 9:40 | 9:10 | 7:50 | 10:10 |
| peak exotherm, °C. Theoretical | 190 | 210 | 211 | 211 |
| Equiv. wt., solids | 383 | 348 | 337 | 334 |
| Unsat./1000 g, solids | 2.83 | 3.13 | 3.23 | 3.25 |
| Aromaticity, wt. % solids | 23.5 | 26.0 | 26.8 | 27.0 |

All of these were "thickened" rapidly in 60 minutes at a 100 Isocyanate Index with Upjohn's Isonate 143L.

TABLE XVIIA

| Resin Designation | SG-317 | SG-318 | ET-104 | NET-233 |
|---|---|---|---|---|
| Isophthalic Acid, moles | 1.0 | 1.0 | 1.0 | 1.0 |
| Maleic Anhydride, moles | 1.3 | 1.5 | 1.0 | 1.0 |
| Diethylene Glycol, moles | — | 1.1 | 2.6 | 2.64 |
| Ethylene Glycol, moles | 0.9 | 0.95 | — | — |
| Neopentyl Glycol, moles | 2.9 | 1.1 | — | — |
| Styrene, wt. % | 32 | 28 | 44 | 35 |
| Acid Number, solids | 2.9 | 2.0 | 5.3 | 0.85 |
| Hydroxyl Number, solids | 106 | 120 | 139 | 114 |
| Brook. Visc. cps (25° C.) | 1020 | 1190 | 52 | 252 |
| SPI Gel Test (Std | | | | |
| gel time, min/sec | 9:55 | 9:25 | 6:55 | 7:40 |
| cure time, min/sec | 13:40 | 12:50 | 10:55 | 12:05 |
| peak exotherm, °C. Theoretical | 198 | 192 | 180 | 176 |
| Equiv. wgt., solids | 517 | 460 | 405 | 488 |
| Unsat./1000 g, solids | 2.61 | 2.78 | 2.06 | 2.04 |
| Aromaticity, wt. % solids | 33.3 | 30.7 | 34.2 | 33.9 |

All of these were "thickened" rapidly in 60 minutes at a 100 Isocyanate Index with Upjohn's Isonate 143L.

TABLE XVIII

Other Formulations Hybrid Systems
With Variation Formulation by Variables

| Resins Design | TG-188A | TG-189 | TG-190 | TG-89L |
|---|---|---|---|---|
| IPA, moles | 1 | 1 | 1 | 1 |
| MAA, mole | 1 | 1 | 1 | 1 |
| DEG, moles | 2.6 | 2.85 | 2.29 | 2.64 |
| Styrene Control, wt. % | 23.9 | 19.4 | 36.2 | 38.8 |
| Acid number, solids | 1.9 | 3.2 | 2.9 | 4.2 |
| Hydroxyl Number, solids | 104.7 | 169.5 | 47.0 | 142.2 |
| *Styrene Monomer (100 II) wt. % | 19.8 | 14.3 | 33.50 | 31.6 |

*II - Isocyanate index, where 100 II implies a balance of hydroxyl end groups with isocyanate end groups.

All thicken within 60 minutes to tack free, formable surface.

TABLE XIX

Thickening Studies

| System Designation | A | B | C | D | E | F | G |
|---|---|---|---|---|---|---|---|
| Polyester, equiv. | 2.0 | 1.549 | 5.0 | 1.598 | 1.593 | 1.586 | 10.0 |
| Methanol, equiv. | — | 0.25 | — | 0.031 | 0.125 | 0.281 | — |
| Tridecanol, equiv. | — | — | — | — | — | — | — |
| Isonate 143L, equiv. | 1.0 | 0.78 | 2.0 | 0.634 | 0.634 | 0.634 | 3.0 |
| Isocyanate Index | | | | | | | |
| based on Polyester | 50 | 50 | 40 | 40 | 40 | 40 | 30 |
| based on Total Hydroxyl | 50 | 43 | 40 | 39 | 37 | 34 | 30 |
| alcohol, 2% of total hydroxyl | 0 | 13.9 | 0 | 1.9 | 7.3 | 15.1 | 0 |
| Viscosity, million cps | | | | | | | |
| After 24 hrs | >160 | 48.8 | 21.6 | 56.5 | 51.8 | 27.2 | 1.4 |
| After 1 week | — | 67.2 | 28.6 | 67.0 | 60 | 35.2 | 2.0 |
| After 4 weeks | — | 72.6 | 38.8 | 67.2 | 60 | 38.4 | 2.2 |

Note:
All Systems Used Polyester TG-182 (See Table XVII), Isonate 143L and 220 phr (not incl. isocyanate) Snowflake calcium carbonate. All initial viscosities were 6–16,000 cps.
Other systems with greater than 50 isocyanate index based on polyester and greater than 46 isocyanate index based on total hydroxyl exceeded 160 million cps within 24 hours when methanol was used at 1.9–15.7% of the total hydroxyl content.

| | TG-188A | TG-189 | TG-190 | TG-89L |
|---|---|---|---|---|
| Brookfield Visc., cps | 1600 | 1728 | 1450 | 400 |
| SPI Gel Time Test | | | | |
| gel time, min/s | 8:15 | 6:15 | 6:05 | 4:35 |
| cure time, min/sec | 11:55 | 9:55 | 8:00 | 7:40 |
| peak exotherm °C. | 172 | 146 | 212 | 191 |
| Equivalent Wgt., solids | 526.3 | 324.8 | 1124.2 | 388.5 |
| Equivalent Wt., liquid | 691.6 | 403.0 | 1762.1 | 634.8 |
| *Isocyanate (143L 100II) wt. % | 17.2 | 26.3 | 7.50 | 18.4 |
| *Polyester Glycol | 63.0 | 59.4 | 59.00 | 49.9 |

Thickening is speeded up when the equivalent of isocyanate to hydroxyl functionality is 1.4 to 1 or more.

TABLE XIXA

Thickening Studies

| System Designation | H | J | K | L | M | N |
|---|---|---|---|---|---|---|
| Polyester, equiv. | 1.38 | 1.244 | 1.415 | 1.223 | 1.57 | 1.401 |
| Methanol, equiv. | 0.464 | — | 0.906 | — | 0.563 | — |
| Tridecanol, equiv. | — | 0.460 | — | 0.775 | — | 0.52 |
| Isonate 143L, equiv. | 1.4 | 1.40 | 1.045 | 0.634 | 0.634 | 0.441 |
| Isocyanate Index | | | | | | |
| based on Polyester | 101 | 113 | 72 | 85 | 40 | 45 |
| based on Total Hydroxyl | 76 | 82 | 44 | 52 | 30 | 33 |
| alcohol, 2% of total hydroxyl | 25.4 | 27 | 38.5 | 38.5 | 26.4 | 26.8 |
| Viscosity, million cps | | | | | | |
| After 24 hours | >160 | >160 | 2.9 | 6.4 | 3.8 | 3.2 |
| After 1 week | — | — | 6.9 | 9.6 | 4.6 | 2.8 |
| After 4 weeks | — | — | 6.9 | 9.6 | 4.3 | 2.8 |

Note:
Other systems with greater than 50 isocyanate index based on polyester and greater than 46 isocyanate index based on total hydroxyl exceeded 160 million cps within 24 hours when methanol was used at 1.9–15.7% of the total hydroxyl content. Thickening is speeded up where the equiv. of isocyanate to hydroxyl functionality is 1.4 to 1 or more.

Additional thickening systems, based upon isocyanates, useful in the present invention include the thickening systems disclosed in U.S. Pat. Nos. 2,806,835; 2,806,836; 2,879,248; 3,859,381; 3,868,431; 3,886,229; 4,073,828 and the patents disclosed therein; 4,129,641 and 4,232,133.

Curable polymer compositions based on hydroxyl-containing thermosetting acrylic resins thickenable by reaction with polyisocyanates are useful in this invention. The thermosetting acrylic resin is mixed with a low shrink polymer such as, polystyrene, polyethylene, polymethylmethacrylate, polyurethane, styrene-butadiene copolymers, polyvinylacetate, polycaprolactone, cellulose acetate butyrate and the like; a suitable polyisocyanate, e.g., tolylene diisocyanate, MDI, polymeric MDI and the like; a vinyl polymerization catalyst, e.g., t-butyl peroxide; and aggregate. The resulting mixture thickens tack free in 1 to 2 hours and can be made to thicken faster by adding an accelerator, e.g., dibutyltin dilaurate. More branching in the acrylic resin and/or the polyisocyanate also promotes faster thickening. Higher molecular weight acrylic resins and/or higher molecular weight low shrink polymers also impart faster thickening. Suitable thermosetting acrylic resins are actually vinyl esters, as described above and known in the art, without secondary hydroxyl modification to maleate or fumarate form. Thus, they contain hydroxyl groups and ethylenically unsaturated groups. Examples of suitable thermosetting acrylic resins are the reaction products of 2 moles of methacrylic acid and one mole of the diglycidyl ether of bisphenol A or the diglycidyl ether of polymeric bisphenol A-epichlorhydrin. Other examples are the reaction products of epoxidized phenolformaldehyde Novolac resins with one mole of methacrylic acid per mole of epoxy groups of the Novoloc resin. Still other examples are the reaction products of epoxidized ethylenically unsaturated fatty acid triglycerides and one mole of methacrylic acid per mole of epoxy groups of said triglycerides. Thickenable systems of this type are based on interpenetrating network (IPN) systems.

Additional curable polymer compositions include those containing 30 to 60 wt. % of an ethylenically unsaturated monomer and an ethylenically unsaturated polyester containing both hydroxyl and carboxyl groups. A suitable polyester is made from 2 moles of propylene glycol, 2 moles of dipropylene glycol, 1 mole of maleic anhydride, 1 mole of isophthalic acid and 1 mole of trimellitic anhydride and has an acid number of 52.5, a carboxyl content of 4.22 wt. %, a hydroxyl number of 94.3 and a hydroxyl content of 2.86 wt. %. The polyester is diluted with 40 wt. % styrene (60 wt. % polyester) and the resulting curable composition has SPI gel test results (BPO-180° F. ) of 6 min, 6 sec gel time, 10 min, 33 sec cure time and a peak exotherm of 161° C. The resulting curable composition can be thickened with MgO (2 equivalents per carboxy equivalent) followed by thickening with a polyisocyanate (1.4 isocyanate groups per hydroxy group) to provide fast-thickening mixtures, i.e., thickening within 60 minutes or less. The curable composition can be thickened with MgO alone, or polyisocyanate alone, or with polyisocyanate first followed by MgO.

Additional suitable curable polymer compositions contain 40 to 50 wt. % styrene and 60 to 40 wt. % of a polyester made from the reactants given in Table XX and having the properties given in said table.

TABLE XX

|  | Polyester A Mole | Polyester B Mole |
|---|---|---|
| Reactants |  |  |
| Propylene Glycol | 4.0 | 4.0 |
| Maleic Anhydride | 1.0 | 1.0 |

TABLE XX-continued

|  | Polyester A Mole | Polyester B Mole |
|---|---|---|
| Isophthalic Acid | 1.0 | — |
| Trimellitic Anhydride | 1.0 | 1.5 |
| Properties |  |  |
| Acid Number (undiluted) | 55–65 | 70–90 |
| Styrene Content | 40–50 | 40–50 |
| % —COOH (undiluted) | 4.82 | 6.43 |
| % —COOH (diluted) | 2.65 | 3.54 |

The curable compositions containing polyester A or B from Table XX can be thickened with MgO or a polyisocyanate or both.

An additional group of suitable curable polymer compositions contains 40 wt. % styrene and 60 wt. % of a polyester made from the reactants set forth in Table XXI and having the properties given in said table.

TABLE XXI

|  | A (moles) | B (moles) | C (moles) | D (moles) | E (moles) | F (moles) |
|---|---|---|---|---|---|---|
| Reactant |  |  |  |  |  |  |
| p-Hydroxy-benzoic acid | 2 |  |  |  |  |  |
| Cordura E epoxy | 2 | 1 | 1 |  |  | 1 |
| Neopentyl glycol | 2 |  | 1 |  |  |  |
| Adipic acid | 2 |  | 2 |  |  | 6 |
| Isophthalic acid | 1 | 1 | 1 |  |  |  |
| Salicylic acid |  | 2 | 2 | 2 | 2 | 2 |
| Propylene oxide |  | 1 |  | 2 |  |  |
| 3,4-Bis(dihydroxyphenyl)-3,4-hexanediol |  |  | 1 |  |  |  |
| Ethylene oxide |  |  |  |  | 2 |  |
| Propylene glycol |  |  |  |  |  | 0.1 |
| Fumaric acid |  |  |  | 1 | 1 | 1 |
| Properties |  |  |  |  |  |  |
| Acid Value | 4.5 | 9.5 | 27.2 | 17 | 18.1 | 10.96 |
| Hydroxyl Value | 80 | 83 | 110 | 187 | 147 | 41.4 |
| A.N. (40% styrene | 2.7 | 7.32 | 16.32 | 10.2 | 10.86 | 6.58 |
| H.N. (40% styrene | 48 | 49.8 | 66 | 112.2 | 98.2 | 24.84 |
| % —COOH calcd. A.N. | 0.36 | 0.76 | 2.19 | 1.37 | 1.45 | 0.88 |
| % —OH calcd. H.N. | 2.43 | 2.52 | 3.34 | 5.68 | 4.46 | 1.26 |

The polyesters described hereinabove are disclosed in more detail in U.S. Pat. Nos. 4,331,782; 4,374,267; 4,374,181; 4,368,222; 4,366,193; 4,365,039; 4,343,924 and 4,343,839. These curable compositions can be thickened by 2 to 5 equivalents Group II A metal oxide and/or hydroxide per carboxyl group of the polyester and 1 to 2 equivalents H$_2$O per carboxy group, or they can be thickened with 1.4 to 1.0 func. of polyisocyanate to polyol, or a combination of both to provide the desired rate of thickening rate to provide the desired viscosity.

The aggregate used in the slump-resistant, curable polymer concrete compositions of this invention include sand (e.g., Ottawa sand or Best sand), gravel, crushed rocks or stones of quartz, granite feldspar, gneiss, basalt, porphyry or small pebbles thereof or any other particulate material such as crushed or ground slag used in the manufacture of concrete or asphaltic structures such as highways and the like. Aggregates in which at least 20% by volume of the particles have a minimum dimension of at least 1/16 inch or greater are suitable for use in the compositions of this invention. Preferable aggregates are those in which at least 20% by volume of the aggregate is retained on a No. 8 sieve size screen (approximately 0.093 inch opening) and, most preferable aggregates are those in which at least 20% by volume of the aggregate is retained on a No. 4 sieve size screen (approximately 0.187 inch opening). Aggregate in which at least 20% of its particles pass through a 1-inch screen, preferable a ½-inch screen, and most preferably, a ⅜-inch screen are suitable for use in this invention. Illustrative aggregate suitable for use in this invention is one containing 65 wt. % of fine aggregate as defined in Table XXII below and 35 wt. % of a coarse aggregate as defined in Table XXIII below to provide the combined aggregate as defined in Table XXIV below.

TABLE XXII

| Sieve Size | % Passing |
|---|---|
| ½" | 100 |
| No. 4 | 95–100 |
| No. 8 | 65–95 |
| No. 16 | 45–80 |
| No. 30 | 25–55 |
| No. 50 | 10–35 |
| No. 100 | 2–10 |
| No. 200 | 0–5 |

TABLE XXIII

| Sieve Size | % Passing |
|---|---|
| ½" | 100 |
| No. 4 | 0–30 |
| No. 8 | 0–5 |
| No. 16 | 0 |

TABLE XXIV

| Sieve Size | Combined Aggregate % Passing |
|---|---|
| ½" | 100 |
| No. 4 | 62–75 |
| No. 8 | 42–64 |
| No. 100 | 1–7 |
| No. 200 | 0–3 |

A preferred aggregate conforms to the specifications of Caltrans (California Transportation Department) Section 90-2.02. It is also preferred that the aggregate retained on the No. 4 and No. 8 sieves, when combined, have a maximum of 25% by volume of crushed particles when tested in accordance with Caltrans Test 205 although aggregates having higher and lower amounts of crushed particles are useful in this invention.

Another example of a combined aggregate useful in this invention has the following specification:

| Sieve Size | Combined Aggregate % Passing |
|---|---|
| ½" | 100 |
| ⅜" | 85–95 |
| No. 4 | 68–82 |
| No. 8 | 58–64 |
| No. 16 | 30–45 |
| No. 30 | 12–27 |
| No. 50 | 6–15 |
| No. 100 | 3–7 |
| No. 200 | 0–3 |

The relative amounts of aggregate and curable polymer composition employed in making the polymer concrete compositions of this invention are not narrowly critical. The aggregate can be present in the amount of 5 to 95 wt. %, preferably 5 to 90 wt. %, most preferably 80 to 90 wt. %, based on the combined weight of aggregate and curable polymer composition. The amount of curable polymer composition can vary from 5 to 95 wt. %, preferably 8 to 95 wt. %, most preferably 10 to 20 wt. % based on the combined weight of aggregate and curable polymer composition.

The following examples are presented. All numbered examples illustrate the present invention whereas all lettered examples are comparison examples. In these examples, unless otherwise designated, all parts and percentages are on a weight basis, all temperatures are on the Fahrenheit scale, and the following designations are defined as follows:

THPA—tetrahydrophthalic anhydride.
MA—maleic anhydride.
NPG—neopentyl glycol.
EG—ethylene glycol.
DEG—diethylene glycol.
IPA—isophthalic acid.
FA—fumaric acid.
HBA—hydrogenated bisphenol A.
PBA—propoxylated bisphenol A.
CHP—cumene hydroperoxide.
MEKP—methyl ethyl ketone peroxide.
cps—viscosity in centipoises at 25° C. using a Brookfield viscosimeter.
%—percent by weight unless otherwise specified.
pph—parts per hundred based on ethylenically unsaturated polymer.
ppm—parts per million based on ethylenically unsaturated polymer.

Ethylenically Unsaturated Polymer A—a mixture of about 38% styrene and about 62% of an unsaturated polyester resin made from 1 mole IPA, 1 mole MA and 2.15 moles of DEG. The mixture has a viscosity of about 415 cps, a specific gravity of about 1.12, and an average acid number of 20–25 which equates to about 1.8 to 2% carboxyl groups.

Ethylenically Unsaturated Polymer B—a mixture of 44% styrene and 56% of an unsaturated polyester resin made from 1 mole IPA, 1 mole MA and 2.15 moles DEG. The mixture has a viscosity of 115 cps, a specific gravity of 1.01 and an average acid number of about 20 which corresponds to about 1.6% carboxyl groups. The unsaturated polyester resin has hydroxyl groups in its backbone and contains at least about 0.2% water.

Ethylenically Unsaturated Polymer C—a mixture of 45% styrene and 55% of an unsaturated polyester resin made from 1.1 mole propoxylated bisphenol A and 1 mole FA. The mixture has a specific gravity of about 1.05 to 1.07 and an average acid number of about 23 which corresponds to about 1.85% carboxyl groups. The mixture contains at least 0.2% water and has hydroxyl groups on the polyester resin backbone.

Ethylenically Unsaturated Polymer D—a mixture of 40% vinyl toluene and 60% of an unsaturated polyester resin made from 1.2 moles THPA, 2.8 moles MA, 2.0 moles NPG and 2.2 moles EG. The mixture has a viscosity of 500 to 550 cps and an average acid number of 31 to 33 which corresponds to about 2.56% carboxyl groups.

Ethylenically Unsaturated Polymer E—a modified vinyl ester type styrene diluted unsaturated polyester prepared in accordance with Jernigan's U.S. Pat. No. 3,466,259. A vinyl ester polyester was prepared by reacting 6.5 lbs of B-hydroxyethyl acrylate, 5.325 lbs of maleic anhydride and 2.725 grams of monotertiarybutyl hydroquinone which serves as a polymerization inhibitor for the acrylate. The temperature was raised to 80° C., maintained there for 30 minutes and then raised to 115° C. and held there until the percent acid as —COOH was about 20.95. On cooling to 60° C., 9.5 lbs of a diglycidylether of 4,4'-isopropylidene diphenol (having an epoxide equivalent of about 175) was added along with 21.6 grams of DMP-30 (2,4,6-tri(dimethylaminomethyl) phenol. The temperature was raised to 110° C. and held at that temperature for such a time until the percent acid (as —COOH) was 0.52 percent. On cooling to 73° C., 2.665 lbs of maleic anhydride were added, the temperature was raised to 100° C. and the reaction allowed to digest for about 3 hours to complete the reaction. At the conclusion of the reaction, the resin contained about 5.53 percent acid (as —COOH) corresponding to about a 50 percent conversion of secondary hydroxyl groups to pendant maleate half ester groups contained about 0.2% H$_2$O and has some hydroxyl groups on its polymer backbone. This resin, after cooling to 60° C., was blended with 16 lbs of styrene to give a final composition of about 40 percent of styrene and 60% of the above described resin. The resulting mixture had a viscosity of about 400 to 500 cps and an acid number of about 47 to 48 which equates to a carboxyl group content of about 3.8%.

Unsaturated Polyester Polymer F—(ITP-1054) The ITP resin systems are described in ICI America Inc. U.S. Pat. Nos. 3,859,381; 3,868,431; 3,886,229; 4,073,828, 4,129,641 and 4,232,133.

Unsaturated Polyester Polymer G—a mixture of 33% styrene and 67% of a hybrid unsaturated isopolyester polyol prepared by reacting one mole of IPA, 2 moles of MA, 1.96 moles of DEG, and 1.96 moles of EG in the one-stage procedure wherein all the ingredients are charged simultaneously and a maximum cook temperature of 232° C. was used. This reaction mixture cooked to an acid number of about 4.0 based on solids. The controlled hydroxyl number attained was 150. The standard SPI gel test results were: gel time—5.0 minutes; cure time—7.5 minutes and the peak exotherm 210°-212° C. The theoretical equivalent weight solids was about 337, the unsaturation/1000 gs solids was about 3.23 and the aromatics content in wt. % solids was 26.8. Polymer G as diluted with styrene has a viscosity of 240 to 250 cps.

Primer A—a mixture of 53% styrene and 47% of an unsaturated polyester resin made from 1 mole MA, 0.66 mole HBA and 0.44 mole PBA. The mixture has a viscosity of 100-200 cps, a specific gravity of 1 to 1.07 and an acid number of 8 to 10 which corresponds to 0.8 to 1% carboxyl groups.

Spec. A Aggregate—a combination of 50 to 65% fine aggregate and 35 to 50% coarse aggregate having the following grading limits:

| Sieve Size | % Passing |
|---|---|
| ⅜" | 100 |
| No. 4 | 62–75 |
| No. 8 | 42–64 |
| No. 100 | 1–7 |
| No. 200 | 0–3 |

Spec. B Aggregate—a combination of 50 to 65% fine aggregate and 35 to 50% coarse aggregate having the following grading limits:

| Sieve Size | % Passing |
|---|---|
| ½" | 100 |
| ⅜" | 85–95 |
| No. 4 | 68–82 |
| No. 8 | 58–64 |
| No. 16 | 30–45 |
| No. 30 | 12–27 |
| No. 50 | 6–15 |
| No. 100 | 3–7 |
| No. 200 | 0–3 |

Modifier M—a 33% dispersion of magnesium oxide in an unsaturated polyester resin made from a reactive unsaturated polyester having an acid value of less than 10, preferably less than 5, and having a viscosity of 10,000 to 18,000 cps.

MDI -

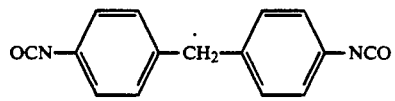

Polymeric MDI -

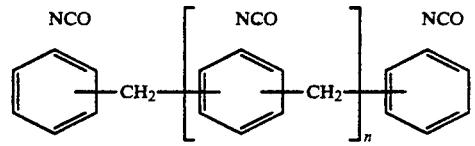

wherein n is an integer of 0 to 7.

EXAMPLES 1 AND A

Dual test runs were made using ethylenically unsaturated polymer A with and without modifier M, Examples 1 and A, respectively. In each of these examples, 4000 grams of polymer A were prepromoted with a small amount of a copper compound and a small amount of an amine derivative. To each 4000 g batch of prepromoted polymer A there was added 1-1.5% (1.0%) by wt. based on polymer A of cumene hydroperoxide (CHP) with intensive mixing (this amounted to 40 grams). To one batch (Example A) no Modifier M was added and, to the second batch (Example 1, 4% (160 g) Modifier M was added.

EXAMPLE A

The batch without Modifier M (Example A) was prepared into a polymer/aggregate overlay mix by placing the polymer/catalyst batch into a modified mortar mixer and mixing thoroughly with 16,000 grams of the Spec. A aggregate with a shearing action to produce temperatures of 100°-120° F. This gave a 20% polymer-80% aggregate, concrete overlay. After shear mixing for about 10 minutes the wet-out and dispersion of the aggregate being complete, the resulting polymer-aggregate mix was transferred and deposited on the surface of a previously primed (with Primer A) one foot wide by eight foot long (1'×8') concrete slab. The polymer-aggregate concrete overlay was was spread over the surface of the slab and tamped to a smooth, porosity-free consistency and a thickness of about ½ to ¾ inch. The resulting overlay showed some polymer richness on the surface and some tendency to flow under very minimum pressures of tamping and rolling. The resulting overlay had a tendency to adhere or stick to the tamper or roller during final application. The overlay gelled within 60–120 minutes after application to the slab and cured into a hard overlay within 4–8 hours.

EXAMPLE 1

To the second batch of prepromoted, catalyzed polymer A there was added about 4% or 160 grams of Modifier M, MgO solution. This was combined with the prepromoted, catalyzed polymer A at about 90° F. with intensive mixing for about 5 to 10 minutes. The resulting thickening mix was transferred to the high shear, modified mortar mixer and combined with 16,000 grams of the Spec. A aggregate with high shear mixing that generated a temperature about 120° F. Good wetting of the aggregate mix was noted after about 10 minutes and some thickening of the mix was observed. This thickened, low slump polymer concrete/aggregate mix was transferred and deposited to the surface of a primed (with Primer A) one foot by eight foot (1'×8') concrete slab. Continued thickening of the mix was noted to be substantial after about 20–30 minutes. This gave a 20/80 polymer/aggregate overlay composition. The continually thickening, polymer-aggregate mix was rolled with a 25 lb roller by hand and tamped with a weighted steel bar to a ½" to ¾" thick polymer-aggregate overlay within about 30 minutes. The thickening action minimized or eliminated the sticking or adhesion of the overlay to the roller and tamper. The surface showed no polymer richness and gave a uniform, porosity-free (no air entrapment) overlay with good skid resistance on curing. This mixture gelled within 60 to 120 minutes after application to the slab and cured within 4 to 8 hours to a hard surface. Both the non-thickened (Example A) and the thickened (Example 1) overlays exhibited good adhesion, no debonding at the interfaces with the concrete slab, and good skid-resistance. The overlayed slabs when submitted to ASTM and FHWA water, water-salt (CaCl$_2$) solution and freeze-thaw cycling tests showed no adverse effects.

This run (Example 1) indicates that the thickened overlay system of this invention can be handled by the in-line metering and pumping systems utilized with a mobile modified concrete mixer which is used for an unthickened standard commercial run with an unthickened polymer A-aggregate overlay performed on a portion of the Donner Pass (I-80) in California. The use of unthickened polymer A-aggregate overlay using primer A on the concrete roadway was proven to be the most effective resin system to be used on the California Donner Pass projects and did not fail as compared to others. The thickened low slump character of the polymer A-aggregate overlays of this invention can be utilized to vary the polymer-aggregate ratio to various degrees without observing settling of the aggregate, separation of or migration to the surface of the polymer, and to enhance uniform retention of aggregate throughout the overlay.

EXAMPLES 2 AND B

Dual test runs were made using ethylenically unsaturated polymer B with and without Modifier M, Examples 2 and B, respectively. In each of these examples, 4000 grams of polymer B were prepromoted with a small amount of a copper compound and a small amount of an amine derivative. To each 4000 g batch of prepromoted polymer B was added about 1.5% CHP (60 g) based on the weight of polymer B and the resulting batch was subjected to intensive mixing for about 1 minutes. To one batch (Example B), no modifier was added and, to the second batch (Example 2), 4% (160 g) Modifier M was added.

EXAMPLE B

The batch without Modifier M was prepared into a polymer/aggregate overlay composition by mixing the 4000 g batch of polymer B catalyst with 16,000 g of Spec. A aggregate into a modified mortar mixer. The high shearing action in the mortar mixer generated temperatures of 100°–120° F. After shear mixing for about 10 minutes the wet-out of the aggregate was complete and the resulting polymer concrete/aggregate mix was deposited onto the surface of a previously primed (with Primer A) one foot × eight foot (1'×8') long concrete slab. The polymer concrete/aggregate overlay mix was spread over the surface of the slab and tamped and rolled into a smooth, porosity-free (free of air entrapment) consistency to an overlay thickness of ½ to ¾ inch. The resulting overlay showed some surface polymer richness, some aggregate settling and some tendency to flow freely under very minimum pressures of rolling and tamping. The overlay gelled within 60 to 120 minutes after application to the slab and cured into a hard overlay within 4 to 8 hours.

EXAMPLE 2

To the second batch of prepromoted, catalyzed polymer B there was added 4% or 160 grams of Modifier M thickener. This was combined with the prepromoted, catalyzed polymer B at about 90°–100° F. with intensive mixing for about 5 to 10 minutes. The resulting thickening mix was transferred to the high shear, modified mortar mixer and combined with 16,000 grams of the Spec. A aggregate with high shear mixing that generated a temperature of about 120° F. After about 10 minutes of mixing excellent wet-out of aggregate was noted and thickening of the mix was observed to taking place. This thickening, low-slump polymer concrete/aggregate mix was transferred onto the surface of a previously primed (with Primer A) one by eight foot (1'×8') ong concrete slab. The thickening polymer concrete/aggregate mix was rolled with a 25 lb roller and tamped with a steel bar into a ½ to ¾ inch thick polymer concrete overlay within 30 minutes. As the system thickened, no tendency to adhere or stick to the roller or tamper was noted. The overlay surface showed no polymer richness, nor was there any aggregate settling. The overlay mixture gave a porosity-free (no voids) (no air entrapment) surface with good and uniform aggregate dispersion. This overlay mixture gelled within 60 to 120 minutes after application to the slab and cured within 4 to 8 hours to a hard surface with good skid-resistance. Both the standard "non-thickened" and the standard "thickened" overlays exhibited good adhesion, no debonding, no cracking, no delamination and good skid-resistance. The slabs when submitted to ASTM and FHWA tests for water immersion, water-salt (10% CaCl$_2$) solutions, permeability, and freeze-thaw cycling showed no adverse effects. On hammering to break the overlay the break occurs in the concrete slab and not in the overlay or overlay/slab-primed surface interface.

Example 2 also shows that the "thickened" modified overlay system of this invention can be delivered to a highway surface by in-line metering and pumping systems included in the mobile concrete mixer as was used for an "unthickened" standard commercial run made with an unthickened polymer A/aggregate overlay on the Donner Pass Highway I-80 project as described in Example 1 above. The "thickened" low slump character of the polymer/aggregate mix of Example 2 can be utilized to vary the polymer/aggregate ratios, to include other types of aggregates, fillers, hollow sphere, etc., to do this at various extremes of resin/filler ratios without seeing settling of aggregate or fillers, without separation or migration of polymer, and with uniform retention of aggregate dispersion throughout the overlay.

EXAMPLE 3

To 2000 grams of polymer C prepromoted with a small amount of a copper compound and a small amount of an amine derivative was added 1% of CHP or 20 grams. The resulting mixture was combined very rapidly and thoroughly with a high intensity mixer operating at about 500 rpm. To the mix at about 100° F. was added 4% (80 g) of Modifier M and mixed at 500 rpm for 3 minutes. This catalyzed, prepromoted, thickening resin mixture was transferred to a modified mortar mixer and 8000 g of Spec. A aggregate was added and mixed with high shear, heat generating mixing. This polymer/aggregate mix was sheared by 10 minutes reaching a temperature of greater than 120° F. The resulting overlay mixture in its "thickening" form was dropped onto the surface of a pre-primed (with Primer A) concrete slab, 2×2 feet square. The aggregate/polymer mix had thickened to a no flow, low slump condition, almost tack free to the touch within 30 minutes. This thickened polymer/aggregate mix was then rolled with a 25 lb roller (cylindrical) on the primed concrete surface and tamped into a smooth, uniform, air free, void free surface about ¼ to ¾ inch thick and tapering to about ⅛ inch thickness at the edges of the slab. No polymer rich areas, polymer migration or aggregate settling was observed. The overlay was observed to gel within 45 minutes after application to the slab at 80°-90° F. and cured to a solid polymer concrete within 4 hours. The overlay was allowed to continue its cure for 24 hours. The overlayed concrete slab had excellent bonding characteristics, no cracking, no shrinking and had superior abrasion resistance. This overlayed slab was placed in a section of a walk and subjected to normal walking traffic along with exposure to salt treatment (CaCl$_2$) and freeze-thaw conditions for 2 years in a southwestern Pennsylvania weather environment without showing any wear, cracking, debonding, delaminating or chemical breakdown. The surface also exhibited excellent skid and slip resistance.

EXAMPLE 4

To 2000 grams of the polymer D prepromoted with a small amount of a copper compound and a small amount of an amine derivative was added 1.0% (20 g) of CHP catalyst. The mixture was sheared rapidly with a high intensity mixer at 500-750 rpm. To this mixture was added 6% (120 g) of Modifier M based on the resin and at a temperature of 90°-100° F. On addition to the pre-promoted, precatalyzed polymer D the thickener was mixed very rapidly into the mix for 3 minutes at 500 to 750 rpm. The catalyzed, "thickening" polymer D mix was transferred to a mortar mixer and 8000 g of Spec. A aggregate was added to the resin mix with high shear mixing. The resulting mixture was sheared for 10 minutes reaching a temperature of 120° F. The resulting mixture in its "thickening" form was then transferred from the mixer and applied to the surface of a pre-primed (with Primer A) concrete slab, 2×2 feet square. The polymer/aggregate mix had thickened to a no flow, low slump condition within 20 minutes. The resulting "thickened" polymer D/aggregate mix was then rolled with a small 25 lb roller (cylindrical steel) to the primed surface and worked into a smooth, porosity-free, air and void free surface with tamping by a steel bar tamper. No resin migration to the surface or extreme aggregate settling was noted as compared to "non-thickened" standard mixes. The mix was rolled and tamped to a thickness of ¼ to ¾ inches. Very little sticking to the roller or tamper was noted with the resulting thickened overlay. The resulting overlay was observed to gel within 60 minutes after application to the slab at 80° F. and cured to a solid polymer concrete within 4 to 8 hours. The overlay on the slab was allowed to continue to cure for 24 hours and it exhibited excellent bonding to the concrete slab with no shrinking or cracking of the overlay. The overlay exhibited good abrasion and skid resistance. This overlayed concrete slab was placed in a section of a walkway and subjected to the environment of western Pennsylvania and normal walking traffic for over 2 years showing little or no wear and no debonding, delamination, shrinking or cracking. This slat had also been subjected to the use of calcium chloride (CaCl$_2$) for eliminating icing conditions during winter with no adverse effects.

EXAMPLE 5

To 2000 grams of polymer E prepromoted with a small amount of a copper compound and a small amount of an amine derivative there was added 1% (20 g) of the catalyst CHP. The catalyst was mixed very rapidly into the polymer with a high intensity mixer for about 1 minute. The resulting mixture was warmed to about 110° F. and about 8% (160 g) based on polymer of Modifier M (53 g of active MgO) was added with vigorous high speed mixing at 500 to 700 rpm for 3 minutes. To the thickener-modified mix was added 8000 grams of the Spec. A aggregate with high shear, heat-generating mixing. The shearing was completed within 5 to 8 minutes and the "thickened" mix was dumped onto and applied to 2'×2' and 1'×4' concrete slabs (previously primed with Primer A). The "thickening" mixture advanced to a low slump, no flow viscosity within 15 to 30 minutes. The "thickened" polymer concrete overlay mix was rolled to the desired thickness with a small 25 lb steel cylindrical hand roller to ¼ to ½ inch thickness with tamping by a steel bar and tapering to 3/16 inch along edges of the slabs. The "thickened" mix did not adhere to the surface of the roller and tamper. A smooth, non-resin rich surface overlay was produced, showing no resin rich surface due to resin migration nor did it show any aggregate settling but gave a uniformly aggregate dispersed overly. This overlay gelled within 60 to 75 minutes and cured to a bonded, non-cracking, non-shrinking overlay within 8 hours with good surface skid resistance. These overlayed concrete slabs were placed in a walkway and subjected to traffic and the weather of western Pennsylvania. This included water immersion, water-salt ($CaCl_2$) solution and thermal cycling (freeze-thaw) of the area environment No delamination, debonding, cracking, shrinking or chemical breakdown were noted after 1 to 2 years exposure.

EXAMPLE 6

To 1000 g of polymer E prepromoted with a cobalt and/or amine type accelerator are added 12 g of an ethoxylated ethylene diamine (G-790) and 6 g of dibutyltin dilaurate and mixed for 1 to 2 minutes. To the resulting mixture there is added 10 to 15 g of CHP followed by mixing for 1 minute. Thereafter, 91 g of polymeric MDI (ICI-Rubinate M) having a viscosity of 200 to 250 cps, an isocyanate equivalence of 134 and a % NCO content of 31.5 to 32, is added. The mixture is stirred with vigorous shearing for 1 to 2 minutes and 4600 grams of Spec. A aggregate is added with rapid shearing in a Littleford mixer for 2 to 3 minutes. "Thickening" is noted almost immediately on addition of the thickener. The above procedure was repeated the seond time with the MDI being added after the addition of the 4600 grams of Spec. A aggregate. After 2 to 3 minutes mixing, the overlay mix was dumped onto previously primed (with Primer A) concrete surfaces of 2'×2' and 2'×3' square concrete slabs (2" thick). The product was allowed to "thicken" for 5 minutes and was then rolled with a 25 and 50 lb cylindrical steel roller and tamped with a square steel bar to a 0.5 to 0.75 inch thickness overlay. This polymer concrete/aggregate overlay was "thickening" at the following rates:

| Time of measurement | Viscosity, cps |
|---|---|
| 30 to 60 seconds after MDI added | >100,000 |
| 2 minutes after MDI added | $11.2 \times 10^6$ |
| 6 minutes after MDI added | $12.8 \times 10^6$ |
| 30–60 minutes after MDI added | completely tack free |

This polymer/aggregate overlay catalyzed, prepromoted, "thickened" overlay gelled in 60 to 120 minutes after application to the slab and cured to a hard surface within 8 hours and produced a cured, skid resistant surface with no evidence of resin-to-surface migration and provided a uniform dispersion of aggregate that could accommodate and support traffic within 24 hours after application.

EXAMPLE 7

To 1000 grams of the prepromoted, catalyzed polymer E prepared as described in Example 6 there was added a mixture of 3680 g of Spec. A aggregate and 920 g of calcium carbonate filler (Camel-Wite). The resulting mix was sheared in a Littleford type mixer for 3 minutes to insure thorough wet-out of the aggregate/filler and then 91 grams of the polymeric MDI isocyanate thickener described in Example 6 is added into the Littleford type mixer and mixed with vigorous shearing for 2 minutes The contents were then dumped onto the surface of a previously primed (with Primer A) concrete slab as was done in Example 6 above. Again, very rapid "thickening" was noted and after 5 minutes the mixture displayed a no-flow, low slump, almost tack-free surface consistency as it was rolled with a 50 lb cylindrical steel roller and tamped with a 25 lb steel bar to a uniform thickness of 0.5 to 0.75 inch, into an overlay form free of resin rich surface, voids, and air entrapment and which had a uniform aggregate dispersion. The same approximate thickening rates were noted as in Example 6 above. The rolled overlay surface gelled within 60 to 120 minutes after application to the slab and cured into a hard surface within 8 hours. After 24 hours curing the surface could take traffic and exhibited excellent skid resistance.

Examples 6 and 7 can be varied in the relative amounts of polymer, aggregate, filler and thickener used and can be employed using in-line metering, pumping and aggregate conveyance means employed for resurfacing highways.

EXAMPLE 8

Into a Littleford high intensity mixer was added 1580 g of polymer G prepromoted with cobalt and/or amine accelerators. Also added was 20 g of CHP which was mixed with polymer G for 1 minute at high shear speeds. To the resulting mixture was added 420 g of modified MDI (Upjohn Isonate 143L—MDI modified with a minor amount of polycarbodiimide adducts) having a viscosity of 35 cps, an isocyanate equivalent of 144.9 and a wt. % NCO content of 29 and the resulting mixture was mixed for 2 minutes. To the resulting mixture was added 8000 g of Spec. A aggregate and was mixed by a shearing action for 8 to 10 minutes. Noticeable thickening occurs with a generation of heat. The mixture was dumped onto the surface of previously primed (with Primer A) concrete blocks measuring 2'×2'×2" and 2'×3'×2" in size. The mixture was allowed to "thicken" for 15 to 30 minutes to a very low slump, high viscosity, non-flowing, almost tack free consistency and then rolled with a 25 lb cylindrical steel roller to thicknesses of 0.5 to 0.75 inch on the block surface and tamped free of air and voids, giving a non-tacky, free from resin rich surface with good uniform dispersion of aggregate. The system gelled within 60 to 120 minutes after application to the block and cured to a hard surface within 8 hours, becoming fully cured in 24 hours at which time it could support traffic. The surface was crack-free, did not shrink did not debond or delaminate and had good skid resistance.

The viscosity measurements on the thickened resin mix were as follows:

5 minutes after addition of MDI > 150,000 cps
15 minutes after addition of MDI > 500,000 cps
30 minutes after addition of MDI > 1,000,000 cps
60 minutes after addition of MDI > 10,000,000 cps
24 hours after addition of MDI > 40,000,000 cps

EXAMPLE 9

Into a Littleford mixer was added 1100 grams of polymer G, 500 grams of polystyrene solution (25% polystyrene in styrene), 100 grams microthene type polyethylene powder, 30% of CHP. The resulting mixture was shear blended at high speeds for about 2 minutes to give a uniform mix. To this mixture was added 300 grams of the isocyanate chemically reactive thickener Isonate 143L described in Example 8. The resulting mixture was sheared for 2 to 3 minutes and a sample retained for viscosity measurement studies. To this mixture was added 8000 grams of Spec. A aggregate and the resulting mix was shear mixed for about 10 minutes. The mixing generated heat and "thickening" was observed to take place by the viscosity increase. The mixture was dumped onto the surface of previously primed (with Primer A) 2'×2'×2" and 2'×3'×2" concrete blocks and allowed to thicken for 15 to 30 minutes before rolling the mix over the surface to 0.5 to 0.75 inch thicknesses with a 50 lb roller and a tamper. The overlay was rolled and tamped free of any air entrapment to a porosity free surface. The overlay gelled within 60 to 120 minutes after application to the blocks and cured within 8 hours. After 24 hours the surface could support traffic and exhibited good skid resistance. The overlay was uniform and showed no resin migration to the surface and was free from cracks, shrinking, debonding and delamination.

Viscosity Measurements

Viscosity after 10 minutes > 150,000
Viscosity after 20 minutes > 500,000
Viscosity after 30 minutes > 1,000,000
Viscosity after 60 minutes > 10,000,000
Viscosity after 24 hours > 40,000,000

The systems of Examples 8 and 9 can be utilized in in-line metering and pumping and conveying equipped mobile mixers to deliver to the site of application various formulated polymer concrete overlays in a continuous manner and placed in place with commercial pavers utilizing screeds or pans such as Bidwell, Barber-Greene and Gomaco.

EXAMPLE 10

A mixture was prepared from (A) 50 wt. parts of a polymer composition of 50 wt. % styrene and 50 wt. % of a bisphenol A-fumaric acid polyester resin made from bisphenol A and fumaric acid in a 1.2:1 mole ratio and having a number average molecular weight of about 2500, the polymer composition, i.e., 50% styrene-50% polyester resin, having an acid number of 8.5 (an acid number of 15 at 100% solids) and a viscosity of about 400 cps, and containing 0.5 wt. % based on the weight of styrene and polyester resin of cobalt octoate promoter; and (B) 1.5 wt. parts of a delayed thickening agent comprising a 33 wt. % dispersion of magnesium oxide an an unsaturated polyester resin and having a viscosity of 10,000 cps.

The resulting mixture was mixed with 500 wt. parts of silica having a typical screen analysis and chemical analysis of:

| Typical Screen Analysis | | |
|---|---|---|
| MESH | % RETAINED ON | CUM. |
| 16 | 59.60 | 59.60 |
| 18 | 24.30 | 83.90 |
| 20 | 09.50 | 93.40 |
| 30 | 04.70 | 98.10 |
| 40 | 01.10 | 99.20 |
| 50 | 00.60 | 99.80 |
| Thru 50 | 00.20 | |
| Typical Chemical Analysis | | |
| $SiO_2$ | 99.65% | |
| $Fe_2O_3$ | .050 | |
| $Al_2O_3$ | 0.08 | |
| $TiO_2$ | 0.009 | |
| CaO | Trace | |
| MgO | Trace | |
| L.O.I. | 0.08 | |

The ambient temperature was about 74° F. Noticeable thickening of the resulting mix was observed ten minutes after mixing in the thickener. After about 35 minutes had elapsed after mixing the silica with the above-mentioned mixture, 0.5 wt. part of methyl ethyl ketone peroxide catalyst solution containing about 9% active oxygen was mixed into the mix until it was distributed throughout the mix.

The resulting mix was coated onto a concrete sidewalk that had been coated (primed) with a polymer composition identified above (7000 ALV Resin) containing 1 wt. % based on said Resin of the methyl ethyl ketone peroxide catalyst solution. After spreading the mix on the surface to a thickness of 1 inch, the resulting coating was rolled under pressure to a thickness of about ¾ inch, and was allowed to cure. Application, spreading and rolling were completed within about 15 minutes after the methyl ethyl ketone peroxide catalyst was mixed into the mixture of aggregate, resin and MgO. During spreading and rolling there was no run-off of liquid or resin. The coating was hard and tack-free within 60 minutes after adding the catalyst and considered to be capable of supporting vehicular traffic within 4 hours after adding the catalyst. The coated concrete surface was exposed to the elements of Pennsylvania weather for 24 months, including 2 winters, and is still in excellent condition and the coating continues to adhere very well to the concrete surface.

EXAMPLE 11

The procedure of Example 1 was carried out again where, however, the polymer composition of 50 wt. % styrene and 50 wt. % bisphenol A-fumaric acid polyester resin was replaced weight for weight with a polymer composition containing 40 wt. % vinyl toluene and 60 wt. % of a polyester resin made from 2 moles of 1,4-dimethylolcyclohexane, i.e., $C_6H_8(CH_2OH)_2$, 2 moles of neopentylglycol, 1 mole adipic acid, 1 mole tetrahydrophthalic anhydride, and 2 moles of maleic anhydride, and having a molecular weight of about 2059 ±41, an acid number of 22 and a % fumarate of 81% and 0.5 wt. % based on the weight of vinyltoluene and polyester resin of cobalt octoate promoter. The 40% vinyltoluene-60% polyester resin composition had a viscosity of about 800 cps and an acid number of 13 to 14. The polymer composition was mixed with the thickening agent and silica of the same types and in the same proportions as were used in Example 1. Thickening occurred somewhat less rapidly than in Example 1 but occurred within 40–45 minutes after mixing in the thickener After about 1–5 minutes had elapsed after mixing the silica and the above-mentioned mixture, the same amount and type of catalyst solution as used in Example 1 was mixed into the mix of polymer composition, thickener and silica until the catalyst was distributed throughout the mix.

The resulting mix was coated onto a concrete sidewalk surface that had been primed with the same primer as was used in Example 1. The mix was spread on the surface to a thickness of 1 inch, was rolled under pressure to a thickness of ¾ inch and was allowed to cure. Application, spreading and rolling were completed within about 30 minutes after the catalyst was mixed in. There was no slump or run-off of liquid or resin during spreading and rolling. The coating was hard and tack-free within 90 minutes after adding the catalyst and was considered to be capable of supporting vehicular traffic within 4 hours after adding the catalyst. The coated concrete surface was exposed to the elements of Pennsylvania weather for 24 months, including 2 winters, and is still in excellent condition and the coating continues to adhere very well to the concrete surface.

What is claimed is:

1. Method of resurfacing new or existing surfaces of a highway, road, bridge deck, garage deck, airport ramp, airport runway, driveway or sidewalk to provide a skid-resistant surface comprising the steps of:
(A) preparing a polymer concrete composition by
   (1) mixing
      (a) 5 to 95 wt. % of a curable polymer composition containing an ethylenically unsaturated polymer containing carbon, hydrogen and oxygen in the polymer molecule and carbon-bonded carboxyl groups in the amount of about 1 to about 3% based on the weight of said curable polymer composition of carbon-bonded hydroxyl groups in the amount of about 0.5 to about 7.5% based on the weight of said curable polymer composition or both in the molecule, and
      (b) at least one reactive thickener comprising (1) a Group IIA metal oxide or hydroxide in the amount of 0.1 to 20 equivalents per carbon-bonded carboxyl group of said polymer, said Group IIA metal oxide or hydroxide being reactive with said carboxyl groups of said polymer to thicken said polymer composition at a controlled, delayed rate or (2) a polyisocyanate in the amount of 0.1 to 10 equivalents per carbon-bonded hydroxyl group of said polymer, said polyisocyanate being reactive with said hydroxyl groups of said polymer to thicken said polymer composition at a controlled, delayed rate, and
   (2) mixing the resulting mixture of (a) and (b) with (c) 5 to 95 wt. % of an aggregate in which at least 20% of the particles have a minimum dimension of 1/16 or greater before thickening of said polymer composition impedes wetting of said aggregate by said polymer composition to form a slump-resistant, curable polymer concrete composition;
(B) coating said surface with said slump-resistant, curable polymer concrete composition,
(C) compacting and shaping said polymer concrete composition on said surface, and
(D) curing the resulting compacted, shaped polymer concrete composition on said surface.

2. Method as claimed in claim 1 wherein said polymer concrete composition contains an effective amount of a curing catalyst effective to initiate the curing of said polymer composition.

3. Method as claimed in claim 1 wherein said surface being resurfaced is prime-coated with a primer composition comprising a curable polymer composition containing an ethylenically unsaturated polymer containing carbon, hydrogen and oxygen in the molecule and carbon-bonded carboxyl groups or carbon-bonded hydroxyl groups or both in the molecule, and an effective amount of a curing catalyst effective to initiate the curing of said polymer.

4. Method as claimed in claim 2 wherein said surface being resurfaced is prime-coated with a primer composition comprising a curable polymer composition containing an ethylenically unsaturated polymer containing carbon, hydrogen and oxygen in the molecule and carbon-bonded carboxyl groups or carbon-bonded hydroxyl groups or both in the molecule, and an effective amount of a curing analyst effective to initiate the curing of said polymer.

5. Method as claimed in claim 3 wherein said primer composition also contains at least one reactive thickener comprising (1) a Group IIA metal oxide or hydroxide in the amount of 0.1 to 20 equivalents per carbon-bonded carboxyl group of said polymer, said Group IIA metal oxide or hydroxide being reactive with said carboxyl groups of said polymer to thicken said polymer concrete composition and/or (2) a polyisocyanate in the amount of 0.1 to 10 equivalents per carbon-bonded hydroxyl group of said polymer, said polyisocyanate being reactive with said hydroxyl groups of said polymer to thicken said polymer concrete composition.

6. Method as claimed in claim 3 wherein said primer composition also contains an ethylenically unsaturated comonomer copolymerizable with said curable ethylenically unsaturated polymer in said primer composition wherein the ratio of amount of comonomer to amount of polymer in such primer composition is 1:99 to 70:30 based on weight.

7. Method as claimed in claim 6 wherein said comonomer is styrene in the ratio of styrene to polymer in said primer composition of 30:70 to 60:40 based on weight.

8. Method as claimed in claim 3 wherein said polymer composition also contains an ethylenically unsaturated comonomer copolymerizable with said curable ethylenically unsaturated polymer in said polymer composition wherein the ratio of amount of comonomer to amount of polymer is 1:99 to 70:30 based on weight.

9. Method as claimed in claim 8 wherein said comonomer is styrene in the ratio of styrene to polymer in said polymer composition of 20:80 to 60:40 based on weight.

* * * * *